United States Patent
Rath

(10) Patent No.: US 11,336,539 B2
(45) Date of Patent: May 17, 2022

(54) SUPPORT TICKET SUMMARIZER, SIMILARITY CLASSIFIER, AND RESOLUTION FORECASTER

(71) Applicant: SupportLogic, Inc., San Jose, CA (US)

(72) Inventor: Poonam Rath, San Jose, CA (US)

(73) Assignee: SupportLogic, Inc., San Jose, CA (US)

( * ) Notice: Subject to any disclaimer, the term of this patent is extended or adjusted under 35 U.S.C. 154(b) by 0 days.

(21) Appl. No.: 17/208,115

(22) Filed: Mar. 22, 2021

(65) Prior Publication Data

US 2021/0328888 A1    Oct. 21, 2021

Related U.S. Application Data

(60) Provisional application No. 63/012,644, filed on Apr. 20, 2020.

(51) Int. Cl.
| | | |
|---|---|---|
| *H04L 41/5074* | (2022.01) | |
| *H04L 41/16* | (2022.01) | |
| *G06K 9/62* | (2022.01) | |
| *G06N 20/00* | (2019.01) | |
| *H04L 43/06* | (2022.01) | |

(52) U.S. Cl.
CPC ........ *H04L 41/5074* (2013.01); *G06K 9/6215* (2013.01); *G06N 20/00* (2019.01); *H04L 41/16* (2013.01); *H04L 43/06* (2013.01)

(58) Field of Classification Search
CPC ..... H04L 41/5074; H04L 41/16; H04L 43/06; G06K 9/6215; G06N 20/00
See application file for complete search history.

(56) References Cited

U.S. PATENT DOCUMENTS

| | | | |
|---|---|---|---|
| 6,832,205 B1 | 12/2004 | Aragones et al. | |
| 9,000,934 B1 | 4/2015 | Gordin et al. | |
| 9,473,637 B1 | 10/2016 | Venkatapathy et al. | |
| 9,495,331 B2* | 11/2016 | Govrin | G06N 5/02 |
| 9,678,817 B1 | 6/2017 | Hasbun Pacheco et al. | |
| 10,699,703 B2* | 6/2020 | Green | H04M 3/523 |

(Continued)

OTHER PUBLICATIONS

Office Action dated Sep. 25, 2020, from related U.S. Appl. No. 16/352,692.

(Continued)

*Primary Examiner* — Philip C Lee
(74) *Attorney, Agent, or Firm* — Dergosits & Noah LLP; Todd A. Noah

(57) ABSTRACT

A support ticket summarizer, similarity classifier, and resolution forecaster are described. A system trains a machine learning model to identify topic sequences for support ticket communications, identify topic sequences that are classified as similar, and predict subsequent topics for multiple support ticket communications, in response to receiving the support ticket communications. The machine learning model receives a communication for a support ticket, and then identifies a sequence of topics for the communication for the support ticket. The machine-learning model identifies historical sequences of topics, for historical support tickets, which are classified as similar to the sequence of topics. The machine-learning model uses the historical sequences of topics to predict at least one subsequent topic for the sequence of topics. The system outputs the at least one subsequent topic.

17 Claims, 9 Drawing Sheets

(56) References Cited

U.S. PATENT DOCUMENTS

| | | | |
|---|---|---|---|
| 2003/0046250 | A1 | 3/2003 | Kuettner et al. |
| 2010/0198635 | A1 | 8/2010 | Pirtle et al. |
| 2011/0238409 | A1* | 9/2011 | Larcheveque ...... G10L 15/1815 |
| | | | 704/9 |
| 2011/0289076 | A1* | 11/2011 | Boyle ................ G06F 16/3329 |
| | | | 707/723 |
| 2012/0143564 | A1 | 6/2012 | Li et al. |
| 2013/0268262 | A1 | 10/2013 | Moilanen et al. |
| 2014/0188457 | A1 | 7/2014 | Fink et al. |
| 2014/0245075 | A1 | 8/2014 | Dhoolia et al. |
| 2015/0010134 | A1* | 1/2015 | Erel .................. H04M 3/42068 |
| | | | 379/88.01 |
| 2015/0254687 | A1 | 9/2015 | Konopka et al. |
| 2015/0254689 | A1 | 9/2015 | Amemiya |
| 2016/0098480 | A1 | 4/2016 | Nowson |
| 2017/0111507 | A1* | 4/2017 | McGann ................ H04L 67/02 |
| 2017/0242919 | A1 | 8/2017 | Chandramouli et al. |
| 2017/0300499 | A1* | 10/2017 | Lev-Tov ............... G06F 40/174 |
| 2018/0131559 | A1 | 5/2018 | Tapia et al. |
| 2018/0276061 | A1 | 9/2018 | An et al. |
| 2018/0341395 | A1* | 11/2018 | Yaseen .................. G06F 3/0482 |
| 2019/0213605 | A1 | 7/2019 | Patel et al. |
| 2019/0325897 | A1* | 10/2019 | Liu ......................... G10L 25/63 |
| 2020/0004434 | A1 | 1/2020 | Borlick et al. |
| 2021/0065203 | A1* | 3/2021 | Billigmeier ............ G06N 20/00 |
| 2021/0158146 | A1* | 5/2021 | Singh .................... G06N 3/0454 |
| 2021/0287263 | A1* | 9/2021 | Alon ....................... G06F 40/35 |

OTHER PUBLICATIONS

Office Action dated Mar. 1, 2021, from related U.S. Appl. No. 16/512,638.

\* cited by examiner

| | | |
|---|---|---|
| @5:00 P.M. | Curt Customer: | My laptop's CRM program is miscalculating. Restarting the program and restarting the laptop didn't work. Help! |
| @5:01 P.M. | Support System | To better direct your request, please specify if your laptop is a Mac or if it uses Window. |
| @5:02 P.M. | Curt Customer: | It uses Windows. |
| @5:02 P.M. Support System routes Curt to Ann, specifies no software patches for CRM, suggests checking for program or settings changes, reinstalling, and then booting in safe mode | | |
| @5:04 P.M. | Ann Agent: | Good morning Curt! I am Ann. I will help you with your miscalculating CRM program. I verified that there are no software patches for your CRM program. Did you make any recent changes to your CRM program or laptop settings? |
| @5:08 P.M. | Curt Customer: | No. |
| @5:09 P.M. | Ann Agent: | Please uninstall and reinstall the CRM program. If that doesn't fix the miscalculations, we could try to boot up in safe mode. Please let me know what happens. |
| @5:17 P.M. | Curt Customer: | Reinstalling the CRM program fixed the problem Thanks! |
| @5:19 P.M. | Ann Agent: | You're welcome Curt! Let us know if you need any help. |

FIG. 1B

SUPPORT TICKET SUMMARIZER, SIMILARITY CLASSIFIER, AND RESOLUTION FORECASTER

CROSS REFERENCE TO RELATED APPLICATION

This application claims priority under 35 U.S.C. § 119 or the Paris Convention from U.S. Provisional Patent Application 63/012,644, filed Apr. 20, 2020, the entire contents of which is incorporated herein by reference as if set forth in full herein.

BACKGROUND

A ticketing system (such as provided by Jira, GitHub, ServiceNow, Salesforce, Zendesk, or Freshdesk) generates tickets, which may be referred to as support tickets, service tickets, or cases, that track the communications between individuals, users, groups, teams, organizations, and businesses in interaction spaces such as support, user service, sales, engineering, and information technology. Although many of the following examples are described in the context of a ticketing system for a support space, embodiments of this disclosure apply equally to other ticketing systems for other interaction spaces. In a support space example, a customer of a software product experiences a problem using the software product, activates a ticketing system, and submits a support ticket to the support organization which provides support for the software product. The support organization employs support agents who can receive the support ticket and respond to the customer, which maintains strong accountability standards and customer loyalty. In an ideal situation, a support agent accurately identifies, troubleshoots, and resolves a customer's problem in a timely manner, and closes the support ticket. However, in a less than ideal situation, a customer may become dissatisfied with a support agent's responses to a support ticket.

Most of the interactions between support agents and the customers they serve occur in the form of a stream of communications or comments, which are recorded within a support ticket. While the ideal outcomes for support tickets are speedy resolutions of the problems and satisfied customers, the paths taken to achieve these outcomes are often disparate. On the support agent's part, a problem resolution may involve responding appropriately to a customer's request or question, proactively communicating detailed explanations, harnessing the support agent's own technical expertise, and leveraging the expertise of other support personnel to drive a support ticket's problem to resolution. While support tickets may differ in the nature of the problems raised by the customers, the responsibility of driving customer satisfaction rests with each support agent. The ability to provide prompt and high-quality support is complicated by the fact that support agents in support organizations typically attend to multiple support tickets at the same time. In addition, existing support teams of support agents grow with new support agents joining or switching across teams to provide support for different products and to different sets of customers.

A customer seeks technical help when submitting a support ticket for a software product and expects a context-specific dialogue with a support agent who diagnoses the problem through pointed questions and drives prompt problem resolution. A swift resolution of the problem results in a happy customer who continues to use the software product, which is ultimately the primary focus of the support organization. Additionally, by providing knowledge and tools for solving customer problems to their support agents, a support organization enables these support agents to feel satisfied with their work, thereby reducing churn in support agents and the need to spend the support organization's resources training many new support agents.

One way to achieve efficient problem solving is by using textual data in a support ticket to create a summary of the support ticket. Such a summary can provide support agents with an enriched informational representation of a support ticket and its evolution through time. Current solutions for summarization of support tickets relies largely on metadata such as support ticket age, the type of product, the type of problem, and a support ticket note. However, support ticket age can often be misleading because support tickets differ substantially by complexity, and simple metrics such as support ticket age do not adequately summarize a support ticket. For example, a customer may be unhappy about a support agent's prolonged assistance on a simple support ticket that has a relatively short age and yet be happy about another support agent's effective assistance on a complicated support ticket that has a relatively long age.

Other types of metadata such as the type of product or the type of problem are also limited in their ability to create a summary of an open support ticket, because a customer or a support agent often enters these types of metadata at the outset of a support ticket and therefore these types of metadata fail to capture the evolution of support tickets which developed over the lifetime of the support ticket. Even though a support agent may manually enter a support ticket summary or resolution note, such notes are not always available, and these notes may not record enough information about a support ticket that is also accurate. Furthermore, any effort to forecast the potential resolution of a problem for a summarized support ticket is manually driven and depends on the subject matter expertise of the support agent and the subject matter experts in the support organization.

DETAILED DESCRIPTION

Embodiments herein provide a support ticket summarizer, similarity classifier, and resolution forecaster. A system trains a machine learning model to identify topic sequences for support ticket communications, identify topic sequences that are classified as similar, and predict subsequent topics for multiple support ticket communications, in response to receiving the support ticket communications. The machine learning model receives a communication for a support ticket, and then identifies a sequence of topics for the communication for the support ticket. The machine-learning model identifies historical sequences of topics, for historical support tickets, which are classified as similar to the sequence of topics. The machine-learning model uses the historical sequences of topics to predict at least one subsequent topic for the sequence of topics. The system outputs the at least one subsequent topic.

Figure 1A:
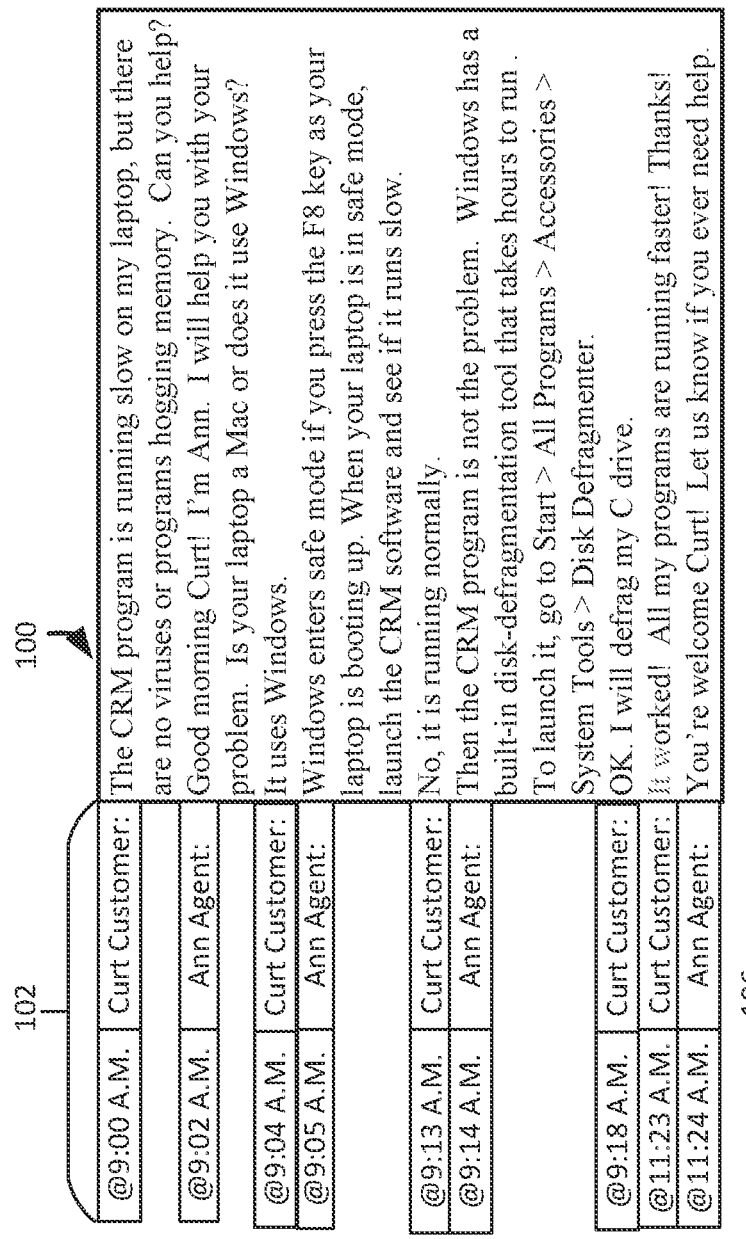
FIGS. 1 A-B illustrate block diagrams of example support ticket communications for a support ticket summarizer, similarity classifier, and resolution forecaster, under an embodiment.

For example, a system includes a training server that receives a training set of support ticket communications, which include a training set support ticket's communications 100 and its metadata 102, as depicted by FIG. 1A. The training server trains a machine learning model to identify the sequence of topics: CRM software, inadequate software performance, scanned for viruses, and checked for programs using excessive resources, to identify similar topic sequences for other support tickets, and to use the similar topic sequences to predict subsequent topics which infer the next actions: boot in safe mode and defragment hard disk. The system also has a production server that automatically receives support ticket communications, which includes a production support ticket's communications 104 and its metadata 106, as depicted by FIG. 1B. The production server's trained machine learning model automatically identifies the sequence of topics: CRM software, software malfunction, restarted software, and restarted computer for the customer's support ticket communications 104 at 5:00 P.M. The machine-learning model identifies other support tickets that have the sequences of topics: CRM software, software malfunction, restarted software, restarted computer, identify any software patches, undo any recent program or settings changes, uninstall and reinstall the program, and boot up in safe mode, which are similar to the customer support ticket's sequence of topics: CRM software, software malfunction, restarted software, and restarted computer. The machine-learning model uses the similar sequences of topics to predict the customer support ticket's future sequence of topics and its actions: identify any software patches, undo any recent program or settings changes, uninstall and reinstall the program, and boot up in safe mode, and outputs a suggestion for a support agent to take these actions. As indicated by the support ticket communications 104 depicted by FIG. 1B, the support agent takes the suggested actions, and the customer's reinstallation of the CRM software corrected the miscalculation problems only 17 minutes after the customer initiated the support ticket.

Figure 2:
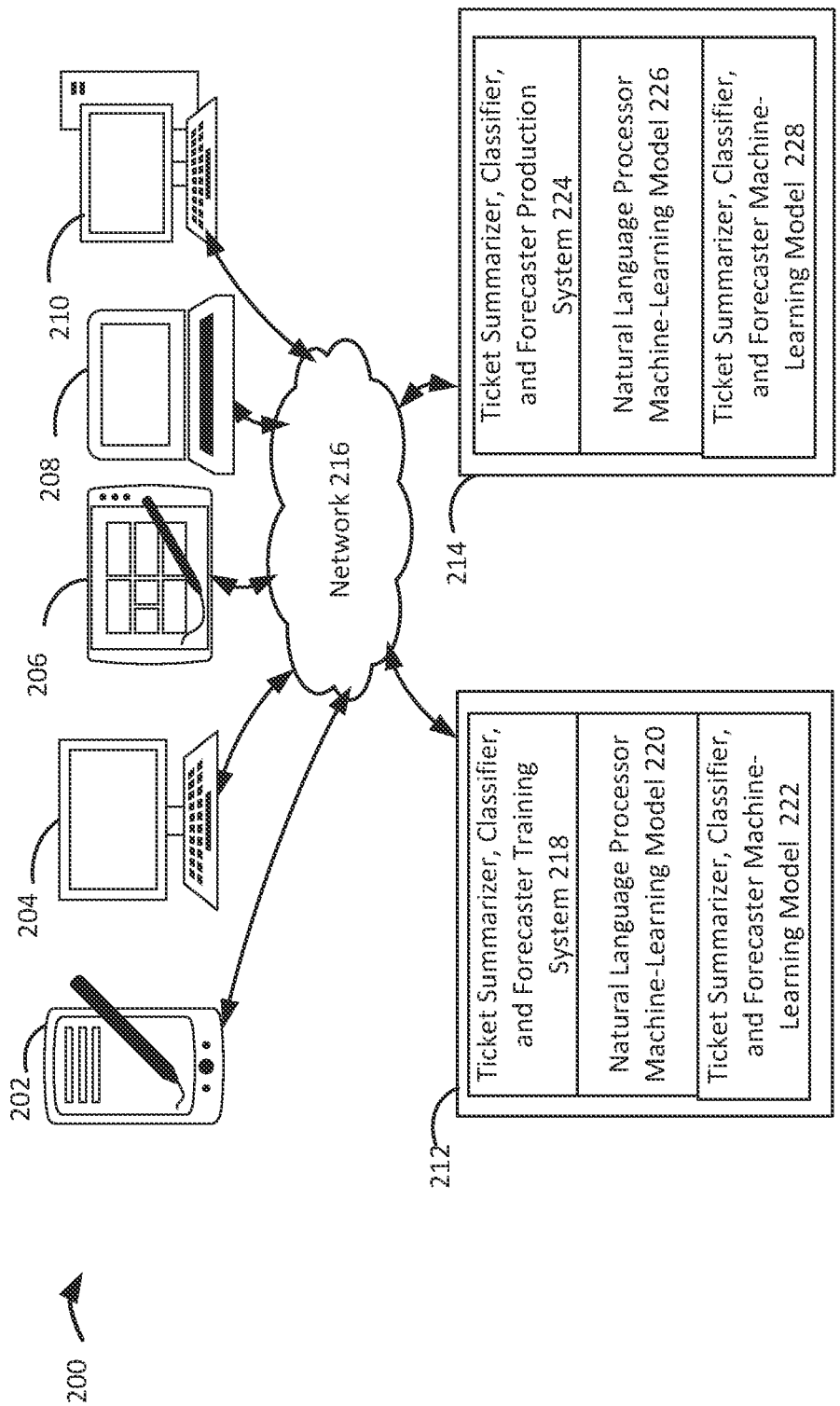
FIG. 2 illustrates block diagrams of an example system for a support ticket summarizer, similarity classifier, and resolution forecaster, under an embodiment.

FIG. 2 illustrates a block diagram of an example system 200 for a support ticket summarizer, similarity classifier, and resolution forecaster, under an embodiment. As shown in FIG. 2, the system 200 may illustrate a cloud computing environment in which data, applications, services, and other resources are stored and delivered through shared data centers and appear as a single point of access for the customers. The system 200 may also represent any other type of distributed computer network environment in which servers control the storage and distribution of resources and services for different client users.

In an embodiment, the system 200 represents a cloud computing system that includes a first client 202, a second client 204, a third client 206, a fourth client 208, a fifth client 210; and a first server 212 and a second server 214 which may be provided by a hosting company. The clients 202-210 and the servers 212-214 communicate via a network 216. The first server 212 may be referred to as the training server 212, and the second server 214 may be referred to as the production server 214. The training server 212 may include a ticket summarizer, classifier, and forecaster training system 218, which may be referred to as the training system 218, and which may include a natural language processor machine-learning model 220 and a ticket summarizer, classifier, and forecaster machine-learning model 222.

The production server 214 may include a ticket summarizer, classifier, and forecaster production system 224, which may be referred to as the production system 224, and which may include a natural language processor machine-learning model 226 and a ticket summarizer, classifier, and forecaster machine-learning model 228. The training system 218 may include the natural language processor machine-learning model 220 and the ticket summarizer, classifier, and forecaster machine-learning model 222, or the natural language processor machine-learning model 220 and the ticket summarizer, classifier, and forecaster machine-learning model 222 may be combined into one training machine-learning model. Similarly, the production system 224 may include the natural language processor machine-learning model 226 and the ticket summarizer, classifier, and forecaster machine-learning model 228, or the natural language processor machine-learning model 226 and the ticket summarizer, classifier, and forecaster machine-learning model 228 may be combined into one production machine-learning model.

Even though FIG. 2 depicts the first client 202 as a smartphone 202, the second client 204 as a terminal 204, the third client 206 as a tablet computer 206, the fourth client 208 as a laptop computer 208, the fifth client 210 as a personal computer 210, and the servers 212-214 as servers 212-214, each of the system components 202-216 may be any type of computer system. The system elements 202-214 may each be substantially similar to the hardware device 500 depicted in FIG. 5 and described below. FIG. 2 depicts the system 200 with five clients 202-210, two servers 212-214, one network 216, two ticket summarizer, classifier, and forecaster systems 218 and 224, two training machine-learning models 220 and 222, and two production machine-learning models 226 and 228. However, the system 200 may include any number of clients 202-210, any number of servers 212-214, any number of networks 216, any number of ticket summarizer, classifier, and forecaster systems 218 and 224, any number of training machine-learning models 220 and 222, and any number of production machine-learning models 226 and 228.

Although FIG. 2 depicts all the training elements 218-222 residing completely on the training server 212, any or all the training elements 218-222 may reside completely on the production server 214, or in any combination of partially on the training server 212, partially on the production server 214, partially on the clients 202-210, such as by residing as data management applications on the clients 202-210, and partially on another server which is not depicted in FIG. 2. While FIG. 2 depicts all the production elements 224-228 residing completely on the production server 214, any or all the production elements 224-228 may reside completely on the training server 212, or in any combination of partially on the production server 214, partially on the training server 212, partially on the clients 202-210, such as by residing as data management applications on the clients 202-210, and partially on another server which is not depicted in FIG. 2. After training to summarize each support ticket and forecast its resolution, the system 200 may be referred to as the trained system 200. When resolving a support ticket's problem, the resolution of the problem may be referred to as the resolution of the support ticket, which subsequently may be referred to as a resolved problem for a resolved support ticket.

The training system 218 can train the natural language processor machine-learning model 220 to automatically analyze a training set of the support ticket communications between the customers who opened support tickets and the support agents who responded to the support tickets, and to possibly use the analysis to summarize a support ticket and forecast its resolution. The training system 218 optionally trains the ticket summarizer, classifier, and forecaster machine-learning model 222 to automatically use the analysis to summarize a support ticket and forecast its resolution, After sufficient training, the ticket summarizer, classifier, and forecaster training system 218 can deploy the natural language processor machine-learning model 220 and/or the ticket summarizer, classifier, and forecaster machine-learning model 222 as the natural language processor machine-learning model 226 and/or the ticket summarizer, classifier, and forecaster machine-learning model 228.

Then the production system 224 can use the natural language processor machine-learning model 226 to automatically provide real-time analysis of the support ticket communications between the customer who opened a support ticket and the support agent who responded to the open support ticket, and to possibly use the real-time analysis to summarize a support ticket and forecast its resolution. Additionally, the natural language processor machine-learning models 220 and/or 226 can automatically provide retrospective analysis of the support ticket communications between the customer who had opened a support ticket which has been closed and the support agent who responded to the support ticket which has been closed and use the retrospective analysis to summarize a support ticket and forecast its resolution. The natural language processor machine-learning model 226 executes at frequent initials to provide real time analysis of subsequent communications which are recorded in an open support ticket and can use the real-time analysis to summarize a support ticket and forecast its resolution. The production system 224 can execute the ticket summarizer, classifier, and forecaster machine-learning model 228 at frequent intervals to automatically use the real-time analysis to summarize a support ticket and forecast its resolution. The ticket summarizer, classifier, and forecaster machine-learning model 228 can automatically use the results of the real-time analysis of subsequent communications to update a support ticket's summary and resolution forecast periodically and then output this updated summary and forecast to end users to ensure that the support ticket's summary and resolution forecast continues to accurately reflect any changes in the support ticket's circumstances.

The ticket summarizer, classifier, and forecaster machine-learning model 222 and the ticket summarizer, classifier, and forecaster machine-learning model 228 are both described as an individual general-purpose machine-learning model that can be trained to summarize a support ticket and forecast the support ticket's resolution in a production environment. However, such an individual general-purpose machine-learning model can be divided into many specialized-purpose machine learning models that are specifically trained to summarize a support ticket and forecast the support ticket's resolution in a production environment. For example, the ticket summarizer, classifier, and forecaster machine-learning model 222 can be divided into a support ticket summarizer machine-learning model, a support ticket similarity classifier machine-learning model, and a support ticket resolution forecaster machine-learning model. Then the training system 218 can train the support ticket summarizer machine-learning model to summarize closed support tickets, the support ticket similarity classifier machine-learning model to classify similar closed support tickets based on the similarities of the closed support ticket summaries, and the support ticket resolution forecaster machine-learning model to forecast resolutions of closed support tickets based on the similar closed support tickets. After these machine-learning models have been sufficiently trained, the production system 224 can deploy the support ticket summarizer machine-learning model to summarize open support tickets, the support ticket similarity classifier machine-learning model to classify similar support tickets based on similarities of the support ticket summaries, and the support ticket resolution forecaster machine-learning model to forecast resolution of open support tickets based on the similar support tickets.

A machine-learning model can be an application of artificial intelligence that provides a system with the ability to automatically learn and improve from experience without being explicitly programmed. A natural language processor can be an electronic component that performs operations on human communications. A communication can be a message. A support ticket can be a request which is logged on a work tracking system, and which describes a problem to be addressed. A support ticket communication can be a message related to a request which is logged on a work tracking system, and which describes a problem that needs to be addressed.

A historical support ticket can be a request which was logged on a work tracking system, and which described a problem to be addressed. An age of a support ticket can be an elapsed period of time since a request was logged on a work tracking system and described a problem to be addressed. Historic ages of historic support tickets can be times associated with a request that was logged on a work tracking system and described a problem to be addressed.

A customer can be a purchaser or leaser of a product and/or a service. A support agent, or a support person, can be a human who uses a work tracking system to help a customer address a problem. A support team can be a group of people who use a work tracking system to help a customer address a problem. A support agent supervisor can be a person who oversees people who use a work tracking system to help customers address problems. A subject matter expert can be an individual with a deep understanding of a particular topic, job, process, department, function, technology, machine, material, and/or type of equipment. A support organization can be an enterprise that uses a work tracking system to help customers address problems.

A topic can be a subject matter of a communication, A subsequent topic can be a subject matter of a communication which is after a previous subject matter in time. A sequence of topics, or a topic sequence, can be a particular order of subject matters of one or more communications. A historical sequence of topics can be a previous order of subject matters of one or more communications. A resolution can be action for solving a problem. Resolution progress can be a measure of action toward solving a problem.

Similar can be comparable, equivalent, or matching. A request can be a solicitation. A suggestion can be a recommendation. Preferable can be more desirable or suitable. A type of information can be a category of knowledge or facts.

The ticket summarizer, classifier, and forecaster systems 218 and/or 224 exposes a query-able interface to accept input data points for periodically determining data for support tickets to generate summaries of support tickets, identify similar summaries of support tickets, and use the similar summaries to forecast the resolutions of support tickets. Such a query-able interface can include, but is not limited to, a REST (Representational State Transfer) Application Programming Interface (API), Python API, Web API, or a web user interface. The ticket summarizer, classifier, and forecaster systems 218 and/or 224 can also be queried for support ticket topics in an ad hoc manner for individual support tickets and/or groups of support tickets, whether open or closed during any time frame, as well as queried for support agents, teams of support agents, customers, products, and the support organization, in part or as a whole.

The natural language processor machine-learning model 226 provides an efficient user experience by enabling humans to communicate in the modes in which they are naturally most comfortable—that of conventional language. A consequence of the breadth and ease with which humans communicate with one another in natural language is that inferring meaning from a support ticket's content is challenging. Therefore, the natural language processor machine-learning models 220 and/or 226 relies on a multitude of advanced natural language processing techniques, some of which are categorized under the domain of machine learning model techniques.

The primary input when determining data for a support ticket communication is the content, or the content data, of the support ticket communication. Although the natural language processor machine-learning models 220 and/or 226 are oriented to mining information from text content, a well-performing voice-to-text application would render the natural language processor machine-learning models 220 and/or 226 as useful for voice calls as well.

The training server 212 trains the natural language processor machine-learning model 220 as an attentional machine-learning model to learn not just the weights of the input words and phrases in how they pertain to a class, but also which words and phrases are most relevant to predictions of a class given the structure of the input words and phrases. The term "attentional" derives from the notion that this technique is, broadly speaking, like the way humans choose what to pay attention to when focusing on a task. A customer who is experiencing a catastrophic computer system failure will give far greater weight to the computer system than to the clouds in the sky. Similarly, an attentional model will give far greater weight to the input that it deems most relevant to a specified task at the expense of other inputs.

This attentional model technique represents a stark contrast to a bag of words model in which all weights for an input have equal importance, and which discards the structure of the input. Attentional predictions are made using a combination of general language models used to infer the syntax (structure and/or organization) of input language and task-specific models used to provide weight to language within the inferred structure. There are several key outcomes of inferring the syntax of language to make predictions, determining the role, such as parts of speech, of individual words, as well as the relationship of words and phrases to one another. Using combinations of tagged parts of speech and word or phrasal relationships enables advanced behaviors such as determining whether a word or phrase is being negated, expressed in a conditional or hypothetical manner, or expressed in a specific tense or mood. These advanced behaviors greatly increase the accuracy of text classification on short documents which cause great challenges for conventional methods.

The simplest way in which predictions are influenced by syntactic features is the suppression of key phrases that are negated. Conceptually, this negation is straightforward in the example, "That is not the problem." However, in practice the natural language processor machine-learning models 220 and/or 226 are reliant on a general language model that can achieve high accuracy using a technique called dependency parsing, in which direct, binary relationships are established between words in a sentence. For example, in the sentence "This is a small problem," the word "small" is directly related to the word "problem," the word "This" is directly related to the word "is," the word "is" is directly related to the word "a," and the word "a" is indirectly related to both the word "problem" and to the word "This." The dependency chain may be followed to conclude that the word "This" is also indirectly related to the word "problem."

Applying the same technique to the more complex example, "This is not a small problem, it is a disaster," determines that the word "it" is indirectly related to the word "disaster," the word "not" is indirectly related to the word "problem," and very importantly that the word "not" is not related to the word "disaster." This attentional model technique provides much more accurate information as to the content of this text than a technique that would simply detect the presence of negative tokens such as "not" and negate all predictions pertaining to that text. Returning to the support context, this same attentional model technique excels where other models do not, such as in the following example "This is a high-priority issue, and your response is not helpful."

Modifying predictions of classes for words or phrases that occur within a conditional or hypothetical context is crucial for suppressing would-be problems or outcomes that people naturally and frequently express. For example, technical support customers frequently express concern about problems that may not have happened, such as, "If this system had gone down due to following your advice, we would have had a major catastrophe on our hands." Since the customer narrowly avoided a major catastrophe, the automatically determined customer sentiment may remain much higher than if the customer was amid a real major catastrophe. Using language-aware techniques enables the natural language processor machine-learning model 226 to suppress language of this type from being surfaced up to or even being sent directly to an inbox of a support organization's upper management. The language-aware techniques result in increased accuracy of the natural language processor machine-learning model 226, and greater confidence by support organizations when the ticket summarizer, classifier, and forecaster machine-learning model 228 identifies a sequence of topics for a summary of a support ticket. In contrast, a bag of words approach, which searches for conditional terms such as would, could, and should, can only identify a small portion of expressions of the subjunctive mood and would unnecessarily suppress predictions when the conditional is unrelated to the key aspects of the language being evaluated, such as "Since your suggestion didn't work, we have a major catastrophe on our hands, and would appreciate a response immediately!"

The natural language processor machine-learning models 220 and/or 226 can determine broad categories of data for a support ticket's communications, such as the content data, the metadata, and the context data. The content data that is determined for any type of support ticket communications refers to the language used by a support agent and a customer when they discuss a problem. The natural language processor machine-learning models 220 and/or 226 automatically determine the relevant content data for identifying a sequence of topics for a support ticket's communications, which are unstructured text, as a summary of the support ticket. Examples of topics identified from content data include a technical topics under discussion, evolving problem diagnosis and problem resolution, a problem type, and a product type. Communications between a customer and a support agent during the lifetime of a support ticket may contain a wide variety of relevant data that may be used to identify a sequence of topics for the summary of a support ticket.

After a customer opens a support ticket and uses natural language to describe the issue they are having with a product, product feature, or product use case, the natural language processor machine-learning model 226 can use content data to identify the product that is causing the problem and can use historical data and/or trends to indicate which products or product features tend to experience critical issues without requiring intimate knowledge of the nature of those products and product features. Therefore, the natural language processor machine-learning model 226 identifying which product is experiencing the problem described in the support ticket can enable a support organization to identify which support agents can provide a high quality of service without a significant investment in resources. For example, the natural language processor machine-learning model 226 determines that a support ticket describes a problem which a customer has with only one of their user interfaces, that the historical data for user interfaces indicates that rebooting a problematic user interface is an effective solution when the problem is limited to a single user interface, and then provides this solution to the support agent who responds to the support ticket.

The ticket summarizer, classifier, and forecaster machine-learning models 222 and/or 228 also identifies a sequence of topics for a support ticket by using the support ticket's metadata, such as a point-in-time customer sentiment, an inferred product, an assigned problem, an assigned support ticket priority, a support ticket note, a support quality metric, the time elapsed since the support ticket was opened, the author of a communication, and whether an individual communication is inbound or outbound. The simplest example of author metadata directly contributing to the identification of a sequence of topics for a summary of a support ticket is whether the author of a communication works for the supporting organization or for their customer. If users are logged into a CRM software website, the ticket summarizer, classifier, and forecaster production system 224 may already be able to determine the identity of each user who authors each communication or may determine the identity of each author through other means. The ticket summarizer, classifier, and forecaster machine-learning models 222 and/or 228 can use the authorship information to identify topics for a summary of a support ticket. For example, the ticket summarizer, classifier, and forecaster machine-learning model 228 identifies the topic of an assigned high priority if the support agent's communication specifies that she is changing a support ticket's priority to high. However, the ticket summarizer, classifier, and forecaster machine-learning model 228 would not identify the topic of an assigned high priority if an emotional customer's communication specifies that the support ticket's priority should be high, and the customer's prior support ticket history indicates that the customer has a tendency to greatly exaggerate the priority of support tickets.

The ticket summarizer, classifier, and forecaster machine-learning models 222 and/or 228 can additionally identify a sequence of topics for a support ticket by using the support ticket's context data, such as information about time gaps between support ticket communications, each-customer's prior support ticket histories, each support agent's support ticket histories, etc. For example, if a customer's prior support ticket histories indicate that the customer greatly exaggerates the severity of his problems when emotional, the ticket summarizer, classifier, and forecaster machine-learning model 228 would not identify the topic of an assigned high priority if the customer's communication is automatically identified as emotional and specifies that the support ticket's priority should be high.

Figure 3A:
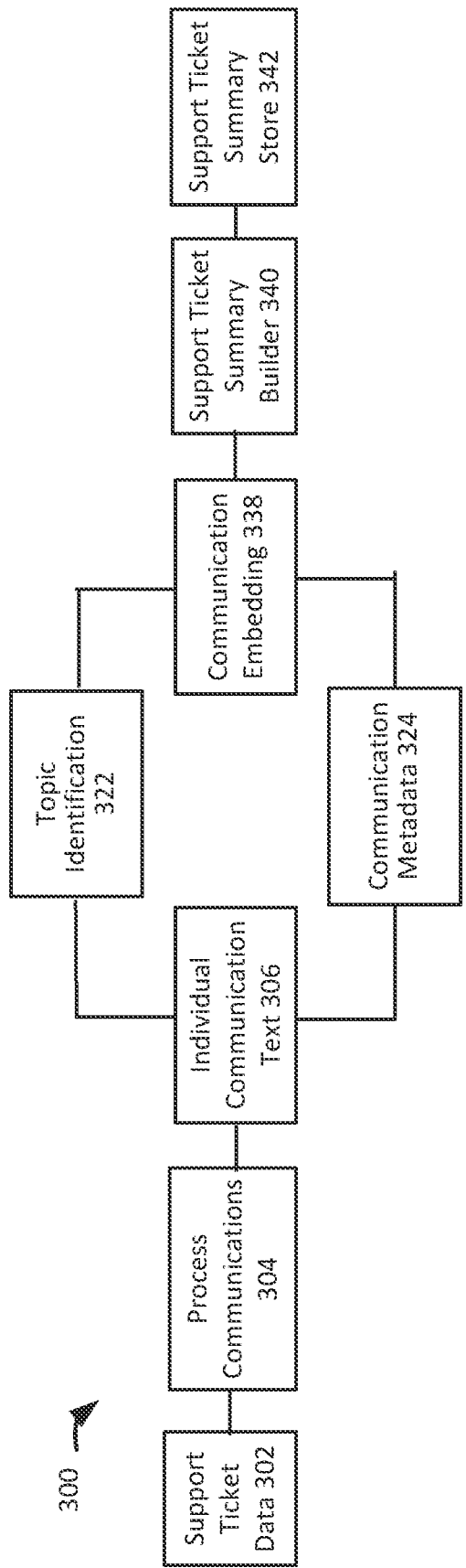
FIGS. 3 A-D illustrate block diagrams of example data flows for a support ticket summarizer, similarity classifier, and resolution forecaster, under an embodiment.

FIG. 3A illustrates block diagrams 300 of an example support ticket summary data flow for a support ticket summarizer, similarity classifier, and resolution forecaster, in an embodiment. After the natural language processor machine-learning models 220 and/or 226 determines the content data, the metadata, and the context data as the support ticket data 302 for a support ticket's communication, the ticket summarizer, classifier, and forecaster systems 218 and/or 224 can process the content data, the metadata, and the context data to process communications 304 as applicable. For example, the production system 224 processes the metadata which identifies the author of a support ticket to produce a simpler feature vector, such as is manager, or is vice president. The potential space of these Boolean (true/false) values is much smaller than the set of all user identifiers, thereby making the simple feature vector much more likely to be a relevant feature to the sequence of topics identification process than just returning the identifier of a system user and expecting a machine learning model to infer the relative importance of that user identifier within a customer's organization. An example of metadata converted to a vector is when the production system 224 detects the presence of a communication, regardless of the communication's content, such as when an inbound communication arrives, and the metadata is converted to an inbound communication activity vector. The ticket summarizer, classifier, and forecaster machine-learning models 222 and/or 228 can create an enriched representation of a sequence of topics for a support ticket in the form of a single numeric support ticket vector that contains information determined from content data, metadata, and possibly context data for individual communication text 306.

Figure 3B:
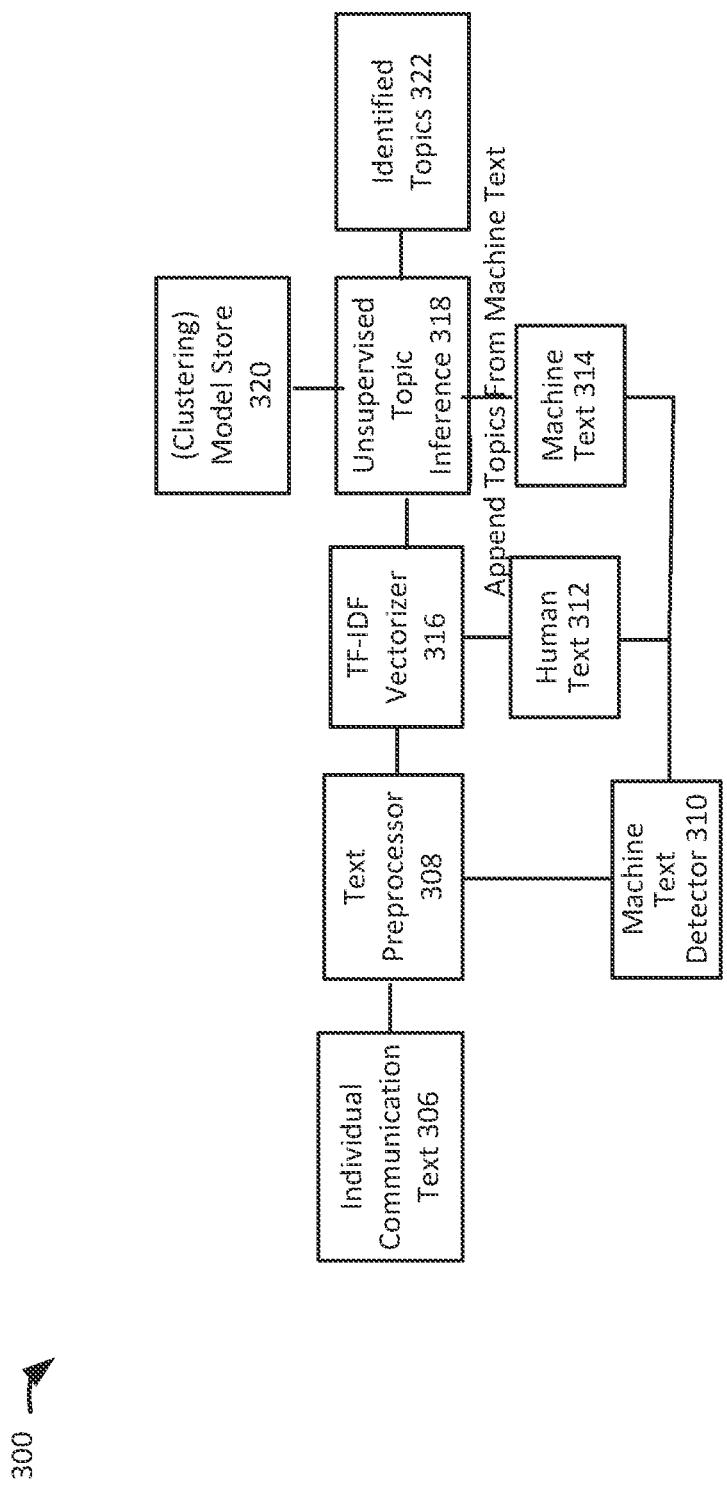
Figure 3C:
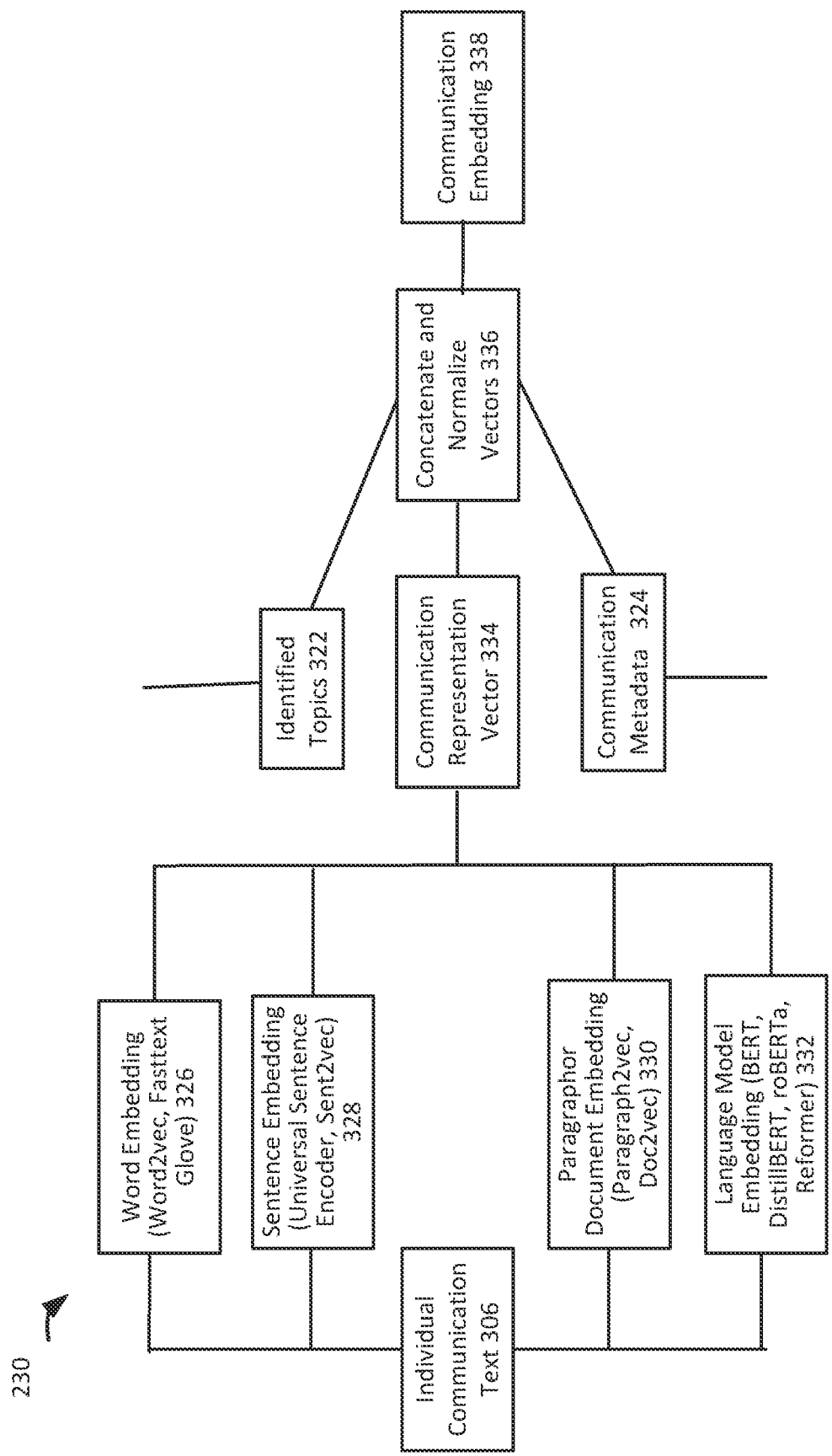

The description below of FIG. 3B depicts how the individual communication text 306 is used to generate the identified topics 322 of both FIG. 3A and FIG. 3B. Similarly, the description below of FIG. 3C depicts how the individual communication text 306 is used with communication metadata 324 to produce the communication embedding 338 of both FIG. 3A and FIG. 3C. As also described below, the communication embedding 338 is used by a support ticket summary builder 340 to build summaries of support ticket, which may be stored in a support ticket summary store 342. These support ticket summaries may be created based on the dimensions along which support tickets typically evolve, such as technical topics under discussion, evolving problem diagnosis and problem resolution.

When converting content data to a vector, the production system 224 can use metadata to determine the magnitude for the vector. For example, the production system 224 converts the part of the content from the part of a communication "I still need help!" to a customer-waiting vector, and then determines the magnitude of this vector based on the metadata that identifies the author of this communication. The production system 224 can generate a greater magnitude for the customer-waiting vector if the author has a high-level role or title within the customer's organization, and generate a lesser magnitude for the customer-waiting vector if the author has a low-level role or title within the customer's organization, Even if the production system 224 generates a lesser magnitude for the customer-waiting vector, the lesser magnitude is still greater than zero, such that the ticket summarizer, classifier, and forecaster machine-learning model 228 can use other means more directly focused on the customer to ensure that such customers still receive adequate care.

The ticket summarizer, classifier, and forecaster systems 218 and/or 224 can automatically determine a customer's sentiments based on the customer's communications which are recorded in a support ticket, and these automatically determined customer sentiments may shift from being initially neutral to being negative at some time in the life of the support ticket, and then swing back to being positive at the successful resolution of a support ticket. In contrast, the evolution of identifying a sequence of topics may be a more complex phenomenon, since the process of topic identification is fuzzy and critically dependent on the domain vocabulary of the company deploying the ticket summarizer, classifier, and forecaster machine-learning models 222 and/or 228. Therefore, the ticket summarizer, classifier, and forecaster machine-learning models 222 and/or 228 may use a variety of approaches to identify a sequence of topics based on support ticket communications.

In one approach, the natural language processor machine-learning models 220 and/or 226 extracts nouns and verbs from the text of a support ticket's communications and the ticket summarizer, classifier, and forecaster machine-learning models 222 and/or 228 transforms these extracted tokens into columns of numeric data representing the total unique tokens from the entire corpus. The number of columns would typically be of a dimension that is lower than the total unique words in the entire corpus of tokens in the support ticket's communications. The value of each column represents the Term Frequency-Inverse Document Frequency (TF-IDF) value of the corresponding token, which the ticket summarizer, classifier, and forecaster machine-learning models 222 and/or 228 uses to create TF-IDF vectors for the extracted nouns and verbs.

If a set of defined topics already exists, then the ticket summarizer, classifier, and forecaster machine-learning models 222 and/or 228 clusters the TF-IDF vectors, so that each cluster has some TF-IDF vectors from support ticket communications, and each support ticket's communications may have associated metadata representing a support agent's assessment of the support ticket topic, such as the "assigned problem type." When assigning a new TF-IDF vector to a cluster, the ticket summarizer, classifier, and forecaster machine-learning models 222 and/or 228 can analyze cluster membership to assign labels corresponding to the modal distribution of the defined topic, such as the assigned problem type label.

FIG. 3B illustrates a block diagram of an example topic identification data flow for a support ticket summarizer, similarity classifier, and resolution forecaster, in an embodiment. The ticket summarizer, classifier, and forecaster systems 218 and/or 224 can use a dedicated machine learning classifier to identify log messages, error messages, command-line instructions and various categories of machine text based on statistical differences between human-generated text and machine-generated text. Using statistical as well as natural language processing-based methods to determine such pieces of information for a support ticket can enable the natural language processor machine-learning models 220 and/or 226 to focus on processing natural language in the support ticket's communications to infer specific topics and power downstream topic inference, without being distracted by machine-generated text. As depicted by FIG. 3B, a text preprocessor 308 pre-processes the individual communication text 306 for a machine text decoder 310, which divides the text into human text 312 for a TF-IDF vectorizer 316 and machine text 314 for an unsupervised topic inference 318. The text preprocessor 308 also pre-processes the individual communication text 306 for the TF-IDF vectorizer 316. A detailed description of some machine-generated text classifier embodiments is discussed in commonly owned U.S. patent application Ser. No. 16/674,581, filed Nov. 5, 2019, which is incorporated in its entirety herein for all purposes.

However, as depicted by FIG. 3B, if the support ticket corpus does not have associated metadata representing support agents' assessments of support ticket topics, the unsupervised topic inference 318 can process the generated TF-IDF vectors from the TF-IDF vectorizer 316 and combine the TF-IDF vectors with detected terms from machine text 314 to train a topic model from a model store 320. Such topics models may be based on Latent Dirichlet Allocation (LDA), Non-negative Matrix Factorization (NMF), and Latent Semantic Indexing (LSI) techniques. Once such a topic model is trained and stabilized, the ticket summarizer, classifier, and forecaster training system 218 subsequently trains a classifier model on the processed data to label incoming TF-IDF vectors with the appropriate set of identified topics 322.

The ticket summarizer, classifier, and forecaster machine-learning models 222 and/or 228 can generate numeric vector representations of each communication in a support ticket using a variety of techniques, including, but not limited to word embeddings that are combined to create phrase or n-gram embeddings, sentence embeddings, paragraph embeddings, and document embeddings. In natural language processing, word embedding, which embeds words in phrases, sentences, paragraphs, and documents, is a representation of the meaning of words. A set of language modeling and language learning techniques, which map words or phrases from a vocabulary to vectors of real numbers, can obtain this representation of the meaning of words. Conceptually, this process involves a mathematical embedding from a space with many dimensions per word to a continuous vector space with a much lower dimension. Methods to generate this mapping include neural networks, dimensionality reduction on a word co-occurrence matrix, probabilistic models, an explainable knowledge base method, and explicit representation in terms of the context in which words appear. The ticket summarizer, classifier, and forecaster machine-learning models 222 and/or 228 can generate these embeddings by using embedding models trained on a corpus of representative data from a support organization's support ticket archive database.

FIG. 3C illustrates a block diagram of an example communication embedding data flow for a support ticket summarizer, similarity classifier, and resolution forecaster, in an embodiment. In a neural network embedding-based approach, the ticket summarizer, classifier, and forecaster machine-learning models 222 and/or 228 can assemble a semantic understanding of each support ticket's textual content, or individual communication text 306, by combining embeddings to generate a communication representation vector 334 on a communication basis and a support ticket basis. Such embeddings may be generated at the level of a word embedding (such as Word2vec, Fasttext, and Glove) 326, at the level of a sentence embedding (such as Universal Sentence Encoder or Sent2vec) 328, or at the level of a paragraph or document embedding (such as Doc2vecor, Paragraph2vec) 330. The ticket summarizer, classifier, and forecaster machine-learning models 222 and/or 228 may also use language model embedding (such as BERT, DistilBERT, and roBERTa), or use updated deep learning architecture-based language model embedding, (such as Reformer) 332. Additionally, such embeddings can either be powered by pretrained vectors or by custom-trained models for each support organization. Subsequently, the communication representation vector 334 may be combined with the identified topics 322 and the communication metadata 324 to concatenate and normalize the vectors 336 to become communication embeddings 338.

The ticket summarizer, classifier, and forecaster machine-learning models 222 and/or 228 may use a hybrid approach of jointly training topic modeling and word embedding to create topics upon which algebra may be used, such as "MySQL−Relational+Document~MongoDB." Jointly training topic modeling and word embedding may be powered by models such as lda2vec. Regardless of the specific approach taken, the ticket summarizer, classifier, and forecaster machine-learning models 222 and/or 228 creates a sequence of topics in the form of one or more coherent support ticket vectors that incorporate information from the content data, metadata, and possibly context data for a support ticket, which enables the use of the sequence of topics for downstream support ticket similarity computations. Once historical as well as progressing support tickets have been summarized as sequences of topics that are stored in a database, the ticket summarizer, classifier, and forecaster production system 224 can retrieve sequences of topics and proceed with the measure of similarity of topic sequences across support tickets.

The ticket summarizer, classifier, and forecaster machine-learning models 222 and/or 228 automatically identifies multiple sequences of topics, for both open and closed support tickets, which are subsequently ranked on their similarities to the sequence of topics for a current support ticket. The ticket summarizer, classifier, and forecaster machine-learning models 222 and/or 228 identifies sufficient similarities between sequences of topics for these support tickets, where the sufficient similarity determination may be as stringent or relaxed as specified by a system user. Further, sufficient similarity may be determined along a single dimension, such as based only on the content data from each support ticket communication, or along multiple dimensions, such as the content data combined with the metadata for the support ticket's priority, which may be set by either the support agent or the customer, and for the automatically determined customer sentiment. Likewise, the sufficient similarity determination may be either time-aligned, time-elastic, or time-agnostic. For example, the machine-learning model can automatically measure similarities between the combination of the sequence of topics and the most recent communication time for a current support ticket and the combinations of the sequences of topics and their corresponding communication times of historical support tickets, and then determine which similarities satisfy a similarity threshold.

When multiple sequences of topics are classified as similar, the multiple support tickets that correspond to these similar sequences of topics may be referred to as similar support tickets. Each historical support ticket for which its measured similarity satisfies the similarity threshold had an amount of resolution progress at a communication time which is similar to the amount of resolution progress of the support ticket at its most recent communication time. For example, since the sequence of topics that exist at 5:00 P.M. for the support ticket communications 104 depicted by FIG. 1B are the topics that the customer introduced when submitting the support ticket, during the process of identifying sequences of topics for other support tickets, the ticket summarizer, classifier, and forecaster machine-learning model 228 can focus on these sequences of topics as they existed at a similar point in time, when the other support tickets were submitted. In another example, when the sequence of topics is updated for the support ticket communications 104 at 9 minutes after the support ticket was created, the ticket summarizer, classifier, and forecaster machine-learning model 228 can focus on the sequence of topics for other support tickets as they existed at approximately 9 minutes after their respective creation times.

The ticket summarizer, classifier, and forecaster machine-learning models 222 and/or 228 can focus solely on the sequences of topics, without taking any timing into consideration, when identifying similarities between sequences of topics. For example, after identifying the sequence of topic A, topic B, and topic C for a support ticket's communications, the ticket summarizer, classifier, and forecaster machine-learning models 222 and/or 228 generates the support ticket's vector as A→B→C, without considering the time gap between the communications from which each topic was identified. Consequently, the vector representation of topic A is followed by the vector representation of the topic B, whether the ticket summarizer, classifier, and forecaster machine-learning models 222 and/or 228 identified the topic A and the topic B from consecutive communications in the support ticket. Then the ticket summarizer, classifier, and forecaster machine-learning models 222 and/or 228 can leverage time series similarity search techniques such as Symbolic Aggregate approXimation (SAX) and Dynamic Time Warping (DTW) to compute alignments between any two support tickets and generate their corresponding similarity score.

Alternatively, the ticket summarizer, classifier, and forecaster machine-learning models 222 and/or 228 can consider the time gap between topics when identifying similarities between sequences of topics. In some support organizations, there is value in capturing the time gap between identified topics, especially when determining the swiftness of resolution. For example, when analyzing all of a specific customer's support tickets that have been summarized as an A→B→C sequence of topics, the ticket summarizer, classifier, and forecaster machine-learning models 222 and/or 228 determines that there is a relatively long gap of time between the communications about the topics A and B compared to a relatively short gap of time between the communications about the topics A and B for other customers. This relatively long gap of time might be because the specific customer takes longer in general to gather the data requested during the communication of topic A before the data is used around the time right before communicating the topic B. In other support tickets, the time lag between two communications about two topics could be on account of the technical complexity of the problem itself, which is reflected in a delayed diagnosis, such that regardless of the customer who submitted the support ticket, there will be a consistent lag observed between the two communications of the two topics A and B.

The ticket summarizer, classifier, and forecaster machine-learning models 222 and/or 228 can identify similarities of topic sequence across multiple dimensions, such as the sequence of topics and the automatically determined customer sentiment. For each such dimensions, the ticket summarizer, classifier, and forecaster machine-learning models 222 and/or 228 can compute a similarity vector to score and then rank, for a given support ticket, all closed support tickets, and currently progressing support tickets in the support ticket summary database. Then the ticket summarizer, classifier, and forecaster machine-learning models 222 and/or 228 can normalize such scores to a range from 0 to 1, and combine the scores from each dimension, such as by adding the scores, to create a single overall similarity score that may be used to rank the similarities of the sequence of topics and their corresponding customer sentiments. A detailed description of some customer sentiment determination embodiments is discussed in commonly owned U.S. patent application Ser. No. 16/352,692 entitled, AUTOMATIC DETERMINATION OF CUSTOMER SENTIMENT FROM COMMUNICATIONS USING CONTEXTUAL FACTORS, by Charles C. Monnett, et al., filed Mar. 13, 2019, which is incorporated in its entirety herein for all purposes.

The ticket summarizer, classifier, and forecaster machine-learning models 222 and/or 228 can further group sequences of topics based on their support tickets' metadata, such as customer identity, to filter and identify the most similar sequences of topics that are relevant to a specific customer's experience. The ticket summarizer, classifier, and forecaster machine-learning models 222 and/or 228 can identify cross-communication similarity using models such as Siamese networks, which may be used to identify frequent communication patterns in responses from support agents and identify those support agents who frequently provide responses that are devoid of substance. Further, the ticket summarizer, classifier, and forecaster machine-learning models 222 and/or 228 can process cross-communication similarity matrices to identify the typical communication that occur in response to problems which are defined as a sequence of topics. The ticket summarizer, classifier, and forecaster machine-learning models 222 and/or 228 can use such communications to automatically provide response suggestions to support agents.

If a hybrid implementation has been used to compute single support ticket vectors to represent an entire support ticket, the ticket summarizer, classifier, and forecaster machine-learning models 222 and/or 228 can compute similarity across support tickets by any number of mathematical and statistical distance metrics, such as Euclidean distance, Minkowski distance, Manhattan distance, correlation distance, and cosine distance. Additionally, the ticket summarizer, classifier, and forecaster machine-learning models 222 and/or 228 can apply normalization steps to the distance vectors to enable each of the appropriate subsequent computations.

The ticket summarizer, classifier, and forecaster machine-learning model 228 can identify historical support tickets that have similar sequences of topics to the current support ticket's sequence of topics, and therefore had similar amounts of resolution progress at similar communication times to the current amount of resolution progress at the most recent communication time of the current support ticket. Therefore, the ticket summarizer, classifier, and forecaster machine-learning model 228 can identify can identify the type of information that was provided by historical customers for the historical support tickets that have historical sequences of topics which are similar to the current support ticket's sequence of topics. Then the ticket summarizer, classifier, and forecaster production system 224 can prompt the customer who submitted the current support ticket, or any support agent who may already be assigned to the support ticket to request for the customer, to provide the identified type of information for the open support ticket. This identified type of information will be similar to the information that was provided by the historical customers who had submitted historical support tickets which have historical sequences of tokens that are similar to the sequence of tokens for the current support ticket.

Once the identified type of information is received from the customer who submitted the open support ticket, the ticket summarizer, classifier, and forecaster production system 224 can use the identified information to assign the current support ticket to the appropriate support agent via a more context-specific routing. If this type of information is identified before a support ticket is assigned to a support agent, and the ticket summarizer, classifier, and forecaster production system 224 determines that the type of information is necessary to proceed with problem diagnosis, the ticket summarizer, classifier, and forecaster production system 224 can politely request for the current customer to share the same type of information. Then the ticket summarizer, classifier, and forecaster production system 224 can receive and use the identified type of information to assign a degree of urgency and importance to a support ticket before routing, suggesting, or assigning the support ticket to the appropriate support agent, using a support ticket assignment system. A detailed description of some support ticket assignment embodiments is discussed in commonly owned U.S. patent application Ser. No. 16/906,412, filed Jun. 19, 2020, which is incorporated in its entirety herein for all purposes.

As an open support ticket progresses at points of time, the machine-learning model can automatically analyze the open support ticket at points in time to identify historical support tickets which made similar progress through historical times that were similar to the points in time for the open support ticket. Then the ticket summarizer, classifier, and forecaster machine-learning model 228 automatically uses sub-sequence of topics in the sufficiently similar sequences of topics to forecast the probabilities of future sequence of topics as the resolution forecast for the support ticket. Provided with projected probabilities of future sequences of topics for the support ticket based on the identified sequence of topics for historical support tickets, a support agent may better evaluate whether an open support ticket is making expected progress toward resolution.

Figure 3D:
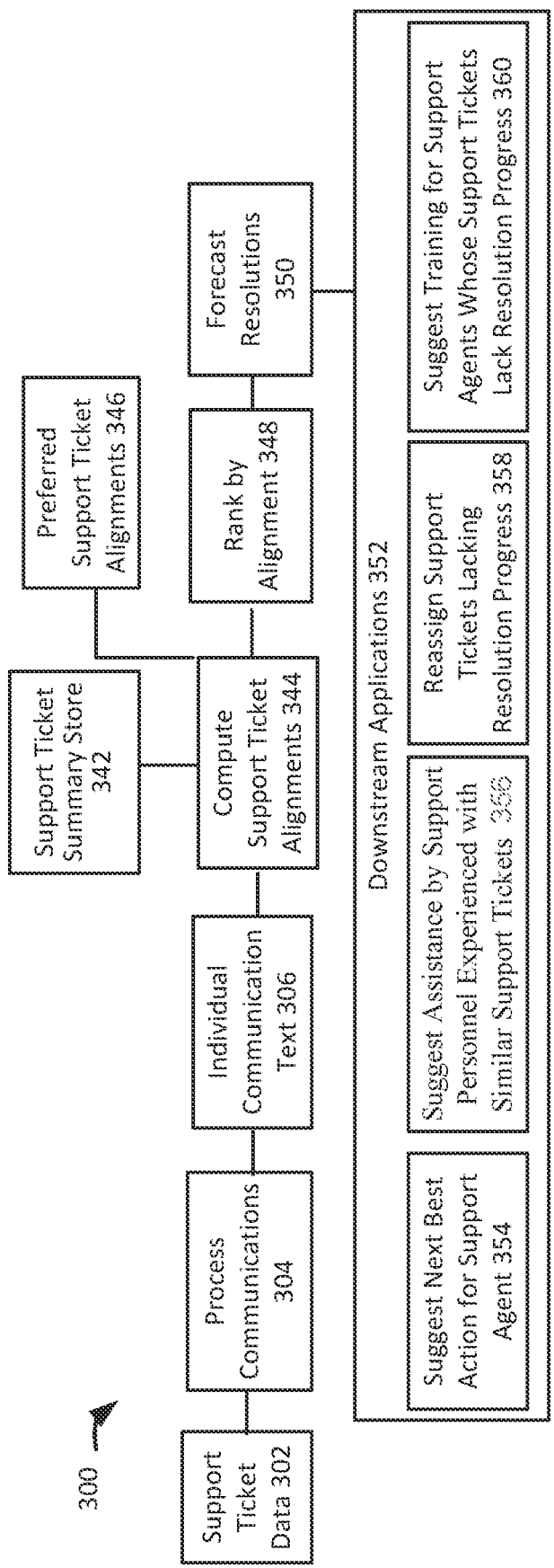

FIG. 3D illustrates a block diagrams of an example resolution forecasting data flow for a support ticket summarizer, similarity classifier, and resolution forecaster, in an embodiment. As described above in reference to FIG. 3A, after the natural language processor machine-learning models 220 and/or 226 determines the content data, the metadata, and the context data as the support ticket data 302 for a support ticket's communication, the ticket summarizer, classifier, and forecaster systems 218 and/or 224 can process the content data, the metadata, and the context data to process communications 304 as applicable. The ticket summarizer, classifier, and forecaster machine-learning models 222 and/or 228 can create an enriched representation of a sequence of topics for a support ticket in the form of a single numeric support ticket vector that contains information determined from content data, metadata, and possibly context data for individual communication text 306. After identifying a sequence of topics as a summary of a current support ticket, the ticket summarizer, classifier, and forecaster systems 218 and/or 224 then identifies older support tickets, from the support ticket summary store 342, which had starting sequences of topics that are similar to the current support ticket's entire sequence of topics, and then uses the similar starting sequences of topics to infer or forecast the future sequence of topics for the current support ticket.

To classify historical support tickets' sequences of topics as similar to the current support ticket's sequences of topics, the ticket summarizer, classifier, and forecaster machine-learning models 222 and/or 228 can compute support ticket alignments 344 by using preferred support ticket alignments 346. After the current support ticket's sequence of topics is aligned to the historical support tickets' sequences of topics, the ticket summarizer, classifier, and forecaster machine-learning models 222 and/or 228 maps out the conditional probabilities of occurrences for a spectrum of future sequences of topics and outcomes for the current support ticket as resolution forecasts for the current support ticket. Since some of these resolution forecasts may be based on sequences of topics that lead to preferred outcomes while other resolution forecasts may be based on sequences of topics that lead to non-preferred outcomes; the ticket summarizer, classifier, and forecaster machine-learning models 222 and/or 228 can then rank by alignment 348 each of these resolution forecasts based on preferred outcomes, such as customer satisfaction, support ticket resolution time, or customer sentiment.

Within a group of historical support ticket s that are similar in terms of their sequences of topics, the ticket summarizer, classifier, and forecaster machine-learning models 222 and/or 228 can use a specified threshold to differentiate between forecast resolutions 350 for historical support tickets that progressed poorly from historical support tickets that progressed to a swift problem diagnosis and resolution. The following are examples of some downstream applications 352 that are enabled by the forecast resolutions 350. When the sequence of topics for a current support ticket is classified as similar to the sequence of topics for poorly progressing historical support tickets, the ticket summarizer, classifier, and forecaster machine-learning model 228 can aid the support agent handling the current support ticket by identifying support tickets which have sequences of events that are similar to the current support ticket's sequence of topics and that led to preferred outcomes. Then the ticket summarizer, classifier, and forecaster machine-learning model 228 identifies subsequent sequences of topics from such historical support tickets' similar sequences of topics to suggest the next best action for the support agent 354 to take, which is inferred from the subsequent sequences of topics which lead to the preferred outcomes. Such suggested next actions can include asking the customer for specific types of information and suggesting specific knowledge documents.

If a threshold is not specified or available, the ticket summarizer, classifier, and forecaster machine-learning model 228 can identify the similar sequences of topics for historical support tickets which share the most frequent subsequences, of topics and then use these subsequences of topics to infer and suggest the next best action to the support agent. The ticket summarizer, classifier, and forecaster machine-learning models 222 and/or 228 automatically selects the next support agent action(s) that have the highest probabilities of leading to preferred outcomes, such as the improved resolution time and customer sentiment, which are associated with subsequent sequences of topics for the historical support tickers. Then the ticket summarizer, classifier, and forecaster production system 224 automatically outputs a suggestion for the support agent who is assigned to the current support ticket to take the next support agent action(s). For example, at 5:02 P.M., the ticket summarizer, classifier, and forecaster production system 224 suggested to Ann Agent to check for program or settings changes, to reinstall the program, and then to reboot in safe mode as the next three actions to take, as depicted by FIG. 1B.

The identification of sequences of topics that are sufficiently similar to the current support ticket's sequence of action to forecast support ticket resolutions can enable the machine-learning model to automatically identify the support personnel, both support agents and subject matter experts (SMEs), who are currently working on support tickets with sequences of topics that are sufficiently similar to the currently open support ticket's sequence of topics. Similarly, the machine-learning model can automatically identify the support personnel who previously worked on closed support tickets that had preferrable outcomes and have sequences of topics that are sufficiently similar to the currently open support ticket's sequence of topics. Since these identified support personnel are working on similar support tickets or have experience at working on similar support tickets that closed with preferred outcomes, the ticket summarizer, classifier, and forecaster production system 224 can output a suggestion for assistance by the support personnel who are experienced with similar support tickets 356, who can work as potential collaborators with the support agent who is assigned to the currently open support ticket. The support agent working on the current support ticket can request help from such identified support personnel or the support personnel can contact the support agent to volunteer assistance with the current support ticket. For example, the production system 224 notifies Sue Supervisor, who is experience at resolving CRM software malfunctions on computers that execute the Microsoft Windows operating system, that Curt's support ticket is more than 15 minutes old, and 15 minutes was the average resolution time for support tickets for CRM software malfunctions on computers that execute the Microsoft Windows operating system. The ticket summarizer, classifier, and forecaster production system 224 can group open support tickets that have sequences of topics which similar to each other's sequence of topics and that are currently progressing in parallel, enabling the support agents assigned to these support tickets to connect with each other and actively collaborate with each other on solving such open support tickets.

The production system 224 may execute when a new event occurs for a new support ticket or an already open support ticket, such as responding to a customer generating a new communication for the new support ticket or the already open support ticket by identifying a new sequence of topics for the new support ticket or updating the sequence of topics in the already open support ticket that has changed since the previous sequence of topics was identified. The production system 224 may also execute at a specified frequency, such as every two hours, as time dependent factors may cause the sequence of topics for a support ticket to change even when there is no support ticket activity. For example, when a support agent has not responded to a customer's urgent request for two hours, the ticket summarizer, classifier, and forecaster machine-learning model 228 infers that the customer sentiment and the probability of a prompt resolution to the problem have both diminished significantly, thereby potentially changing the forecast resolutions for the open support ticket. Therefore, the ticket summarizer, classifier, and forecaster machine-learning model 228 can reassign a support ticket lacking resolution progress 358 to other support personnel, and/or suggest training for the support agent whose support ticket lacks resolution progress 360.

The ticket summarizer, classifier, and forecaster machine-learning models 222 and/or 228 can conduct internal retrospective analysis of a support organization's support tickets over a given time frame. The summarization techniques can apply to support tickets that have been closed and for which complete content data, metadata, and context data are available, as well as those support tickets that are still open; provided that sufficient data is available to identify a sequence of the topics for each open support ticket. Therefore, the ticket summarizer, classifier, and forecaster machine-learning models 222 and/or 228 can generate retrospective analytics reports of support ticket summaries grouped by similar sequences of topics over a given time frame. Retrospective summaries can then be viewed over different time windows, and distinct sequences of topics that represent support tickets over distinct time slices may be identified, thereby powering support teams with insights into the evolving nature of their support tickets.

The following examples are offered for illustrative purposes only and are not intended to limit the scope of this disclosure or to depict any real-world examples. The following training example describes the training system 218 using a training set of support ticket communications to train the ticket summarizer, classifier, and forecaster machine-learning model 222 to summarize a training set support ticket by identifying a sequence of topics from the training set support ticket's communications. Next, the training system 218 trains the ticket summarizer, classifier, and forecaster machine-learning model 222 to use the training set support ticket's sequence of topics to identify archived sequences of topics which are from archived support tickets' communications, and which are classified as similar to the training set support ticket's sequence of topics. Then the training system 218 trains the ticket summarizer, classifier, and forecaster machine-learning model 222 to use the similar sequences of topics to forecast a resolution for the training set support ticket by predicting subsequent topics, which infer the next actions to take to resolve the training set support ticket's problem.

For the training example, the training system 218 receives a training set of support ticket communications, which includes the training set support ticket's communications 100 and its metadata 102, as depicted by FIG. 1A. Then the training system 218 trains the natural language processor machine learning model 220 to understand the customer's 9:00 A.M. communication that initiated a support ticket, "The CRM program is running slow on my laptop, but there are no viruses or programs hogging memory. Can you help?" The natural language processor machine learning model 220 learns to understand that a customer has a CRM software program that is executing slower than expected on the customer's laptop computer, that the customer has already attempted to solve this problem by scanning the laptop for any viruses and by verifying that no programs are using excessive amounts of the laptop's memory, and that the submission of a support ticket infers that the customer's actions did not enable the customer to correct the problem of slow software execution. The training system 218 trains the ticket summarizer, classifier, and forecaster machine-learning model 222 to learn to identify that the customer's CRM program is the topic of Customer Relationship Management (CRM) software, that executing slower than the customer expected is the topic of an inadequate software performance, that the customer scanning for any virus is the topic of scanned for viruses, and that verifying that no programs are using excessive memory is the topic of checked for programs using excessive resources.

Next, the training system 218 trains the ticket summarizer, classifier, and forecaster machine-learning model 222 to learn to identify other support tickets' sequences of topics which are classified as similar to the sequence of the topic of Customer Relationship Management software, the topic of an inadequate software performance, the topic of scanned for viruses, and the topic of checked for programs using excessive resources. While training to identify similar sequences of topics, the ticket summarizer, classifier, and forecaster machine-learning model 222 may learn that the topic of an inadequate software performance is more important for determining similarities between sequences of topics than the topic of any specific software, because inadequate software performance is a problem for an entire computer which adversely affects many different types of software. The ticket summarizer, classifier, and forecaster machine-learning model 222 also may learn that the specific software to which a customer attributes a software slowdown problem was often the program that the customer was coincidentally using when the customer first noticed this computer-based problem that resulted in inadequate software performance.

The ticket summarizer, classifier, and forecaster machine-learning model 222 may have also learned that another support ticket's sequence of topics is not very similar to the current support ticket's sequence of topics if the other support ticket's topics of scanned for viruses or checked for programs using excessive resources were associated with resolving the other support ticket's problem, because these same topics were not associated with resolving the current support ticket's problem. In this situation, the other support ticket's sequence of topics would not be likely to include many additional topics following a topic that is associated with resolving the other support ticket's problem, whereas the ticket summarizer, classifier, and forecaster machine-learning model 222 is attempting to identify many additional topics which are subsequent to these two topics and which may infer solutions to the current support ticket's problem. In this example, the training system 218 trains the ticket summarizer, classifier, and forecaster machine-learning model 222 to learn to identify the following topics as topics which inferred actions that solved the problem of inadequate software performance: close programs using excessive resources, scan for viruses, boot up in safe mode, and defragment the hard drive. Even if other support tickets' sequences of topics were classified as similar to the current support ticket's sequence of topics, the ticket summarizer, classifier, and forecaster machine-learning model 222 may apply a preferred outcome filter to deemphasize or eliminate the sequences of topics for other support tickets which currently have or were closed with an unresolved problem of inadequate software performance.

Then the training system 218 trains the ticket summarizer, classifier, and forecaster machine-learning model 222 to use the similar sequences of topics which infer the actions of close programs using excessive resources, scan for viruses, boot up in safe mode, and defragment the hard drive, to predict the subsequent topics for the current support ticket with the unresolved problem of inadequate software performance. The training system 218 trains the ticket summarizer, classifier, and forecaster machine-learning model 222 to identify the sequence of topics in the order in which their inferred actions should be performed. In this example, the training system 218 trains the ticket summarizer, classifier, and forecaster machine-learning model 222 to learn that the customer has already performed the actions inferred by the topics for close programs using excessive resources, and scan for viruses, leaving the actions inferred by the topics for boot up in safe mode, and defragment the hard drive as the only actions for ordering. Consequently, the training system 218 trains the ticket summarizer, classifier, and forecaster machine-learning model 222 to learn to identify every sequence of topics that includes both the topic of boot in safe mode and the topic of defragment hard disk, and then learn to identify the most frequent ordering of the topic of boot in safe mode and the topic of defragment hard disk.

Support agents may execute an action such as boot in safe mode before an action such as defragment hard disk because booting in safe mode is more likely, based on the currently available information, to solve a slow execution problem than defragmenting the hard drive, defragmenting the hard drive requires more time than booting in safe mode, and the same amount of customer effort may be required for booting in safe mode as for defragmenting the hard drive. When the training system 218 trains the ticket summarizer, classifier, and forecaster machine-learning model 222 to learn the most frequent ordering of the remaining topics for the similar support tickets, this ordering may be based on the support agents balancing the factors for likelihood of an action resolving the problem, the time required by the action, and the ease for the customer to take this action.

In this example, the training system 218 trains the ticket summarizer, classifier, and forecaster machine-learning model 222 to learn that the most frequent order for the subsequent remaining topics for the similar support tickets is the topic of boot up in safe mode followed by the topic of defragment the hard drive. As indicated by the support ticket communications 100 depicted by FIG. 1A, Ann Agent followed this order of actions by suggesting at 9:05 A.M. for Curt Customer to boot up his laptop computer 208 in safe mode, which confirmed at 9:14 A.M. that the software slowdown problem was not caused by the CRM software, and then suggesting at 9:14 A.M. for Curt to defragment the hard drive on his laptop computer 208, which resulted in Curt confirming at 11:23 A.M. that defragmenting solved the problem of slow software execution.

The following production example describes the ticket summarizer, classifier, and forecaster machine-learning model 228 summarizing a real-time support ticket by identifying a sequence of topics from the real-time support ticket's communications. Next, the ticket summarizer, classifier, and forecaster machine-learning model 228 uses the real-time support ticket's sequence of topics to identify historical or previous sequences of topics which are from historical or previous support tickets' communications, and which are classified as similar to the real-time support ticket's sequence of topics. Then the ticket summarizer, classifier, and forecaster machine-learning model 228 uses the similar sequences of topics to forecast a resolution for the real-time support ticket by predicting subsequent topics, which infer the next actions to take to resolve the real-time support ticket's problem.

The production server 214 automatically receives support ticket communications, which includes a production support ticket's communications 104 and metadata 106, as depicted by FIG. 1B. The natural language processor machine learning model 226 processes the customer's 5:00 P.M. language that initiated a support ticket, "My laptop's CRM program is miscalculating. Restarting the program and restarting the laptop didn't work. Help!" The natural language processor machine learning model 226 understands that a customer has CRM software that is miscalculating on the customer's laptop computer, that the customer has already attempted to solve this problem by restarting the CRM software and by restarting the laptop computer, and that the submission of a support ticket infers that the customer's actions did not result in correcting any problem that caused the software miscalculations. The natural language processor machine learning model 226 identifies that the customer's CRM program is the topic of Customer Relationship Management (CRM) software, that software miscalculations is the topic of a software malfunction, that the customer restarting the CRM software is the topic of restarted software, and that the customer restarting the laptop computer is the topic of restarted computer. The ticket summarizer, classifier, and forecaster machine-learning model 228 automatically identifies other support tickets that have similar sequences of topics to the sequence of topics: CRM software, software malfunction, restarted software, and restarted computer.

The ticket summarizer, classifier, and forecaster machine-learning model 228 may have learned that another support ticket's sequence of topics is not very similar to the current support ticket's sequence of topics if the other support ticket's topic of restarted software or topic of restarted computer was associated with resolving the other support ticket's problem, because these same topics were not associated with resolving the current support ticket's problem. In this situation, the other support ticket's sequence of topics would not be likely to include many additional topics following a topic that is associated with resolving the other support ticket's problem, whereas the ticket summarizer, classifier, and forecaster machine-learning model 228 is attempting to identify many additional topics which are subsequent to these two topics and which may infer solutions to the current support ticket's problem. In this example, the ticket summarizer, classifier, and forecaster machine-learning model 228 identifies the following topics as topics which inferred actions that solved the problem of software malfunction: restart the software, shut down and restart the computer, search for software patches, undo any recent settings or software changes, uninstall and reinstall the software, and boot up in safe mode.

Even if other support tickets' sequences of topics were classified as similar to the current support ticket's sequence of topics, the ticket summarizer, classifier, and forecaster machine-learning model 228 may apply a preferred outcome filter to deemphasize or eliminate the sequences of topics for other support tickets which currently have or were closed with an unresolved problem of software malfunction. Although examples describe the use of a preferred outcome filter that is based on unresolved problems, such a filter could be based on other factors such as an expressed customer satisfaction, an inferred customer sentiment, and an estimated support quality metric.

The ticket summarizer, classifier, and forecaster machine-learning model 228 identifies that most of the similar sequences of topics include information that specifies the customer's operating system, but at 5:00 P.M. the support ticket's sequence of topics is missing any information that specifies the operating system of Curt's laptop computer 208. Therefore, the production server 214 outputs a request for the customer to specify whether his laptop computer 208 is a Mac computer that execute a Mac operating system or is a laptop computer that executes the Microsoft Windows operating system. Then the production server 214 receives the customer's answer at 5:02 P.M., which specifies that his laptop computer 208 uses the Microsoft Windows operating system. Therefore, at 5:02 P.M., the production system 224 assigns Curt's support ticket to Ann Agent because she is well-trained at providing support for computers that execute the Microsoft Windows operating system.

The ticket summarizer, classifier, and forecaster machine-learning model 228 uses the similar sequences of topics which infer the actions of restart the software, restart the computer, identify any software patches, undo any recent program or settings changes, uninstall and reinstall the program, and boot up in safe mode, to predict the subsequent topics for the current support ticket with the unresolved problem of software malfunctioning. Then the ticket summarizer, classifier, and forecaster machine-learning model 228 identifies the sequence of topics in the order in which their inferred actions should be performed. In this example, the ticket summarizer, classifier, and forecaster machine-learning model 228 determines that the customer has already performed the actions inferred by the topics for restart the software and restart the computer, leaving the actions inferred by the topics for identify any software patches, undo any recent program or settings changes, uninstall and reinstall the program, and boot up in safe mode as the only actions for ordering. Consequently, the ticket summarizer, classifier, and forecaster machine-learning model 228 identifies every sequence of topics that includes identify any software patches, undo any recent program or settings changes, uninstall and reinstall the program, and boot up in safe mode, and then identify the most frequent ordering of these four topics.

When the ticket summarizer, classifier, and forecaster machine-learning model 228 identifies the most frequent ordering of the remaining topics for the similar support tickets, this ordering may be based on the support agents balancing the factors for likelihood of an action resolving the problem, the time required by the action, and the ease for the customer to take this action. If information already stored about the customer records the version identifier of the customer's CRM software, then the support agent can take the action to determine whether any software patches exist for the customer's software without any involvement by the customer in this action. As indicated by the support ticket communications 104 depicted by FIG. 1B, at 5:04 P.M. Ann informed Curt that she already verified that no software patches exist for his version of the CRM software. The ticket summarizer, classifier, and forecaster machine-learning model 228 can determine the order of the remaining three actions by aggregating their relative sequencing orders in each sequence of topics that includes two or three of the topics that correspond to these actions. For example, if analysis determines that the topic of uninstall and reinstall the program always follows the topic of undo any recent program or settings changes, and always proceeds the topic of boot up in safe mode, then the ticket summarizer, classifier, and forecaster machine-learning model 228 determines that the predicted sequence of subsequent topics will be undo any recent program or settings changes, uninstall and reinstall the program, and boot up in safe mode.

In this example, the ticket summarizer, classifier, and forecaster machine-learning model 228 determines that the most frequent order for the subsequent remaining topics for the similar support tickets is identify any software patches, undo any recent program or settings changes, uninstall and reinstall the program, and boot up in safe mode. Consequently, the production system 224 outputs a suggestion for Ann Agent to take the actions: identify software patches, undo any recent program or settings changes, uninstall and reinstall the program, and boot up in safe mode.

As indicated by the support ticket communications 104 depicted by FIG. 1B, Ann Agent followed this order of actions by stating at 5:04 P.M. that she verified that there are no software patches for Curt's CRM software and asking Curt if he made any recent changes to his CRM software or his laptop computer's settings. After Curt informed Ann that he had not made any recent changes to his CRM software or his laptop computer's settings, at 5:09 P.M. Ann suggested that Curt uninstall and reinstall his CRM software, and indicated that the next corrective action would be to boot up his CRM software in safe mode, which resulted in Curt confirming at 5:17 P.M. that reinstallation solved the problem of CRM software miscalculations, only 17 minutes after he initiated the support ticket.

The deployment of the ticket summarizer, classifier, and forecaster systems 218 and 224 within a support organization allows for improved organizational efficiency. By capturing rich information about topics, problem diagnosis, and problem resolution from support tickets and mining databases for support tickets that have similar sequences of topics, the ticket summarizer, classifier, and forecaster systems 218 and/or 224 allows its users to accurately organize an inventory of support tickets. Such an inventory of support tickets may be leveraged by support teams to discover problem areas for certain products, which in turn can lead to collaborative efforts with other teams like product development, sales, or business strategy in guiding decision-making processes important to the software company. Within a support team, such an inventory may be crucial for new support agents who have yet to develop the depth of knowledge required to swiftly troubleshoot a problem.

The ticket summarizer, classifier, and forecaster machine-learning model 228 facilitates knowledge transfer by surfacing paths to support ticket resolution as well as identifying subject matter experts and specialists with experience in handling complex or heavily domain-dependent support tickets. Even for support agents who are more experienced, suggesting the next actions can reduce cognitive load, and identifying other support personnel to collaborate with can improve overall satisfaction with the support agents' quality of work, and thereby prevent burnout. From a customer's point of view, the improved organizational efficiency described above translates to a context-aware handling of support tickets by support agents, leading to faster resolution and improved customer satisfaction. By generating a more accurate representation of a customer's problems through rich representations of support tickets, the ticket summarizer, classifier, and forecaster machine-learning models 222 and/or 228 can facilitate the designing of customer-centric solutions to enhance customer engagement and minimize customer churn.

The ticket summarizer, classifier, and forecaster systems 218 and/or 224 can integrate with a feedback loop, which captures information from the user interface or interaction layer and incorporates the captured information as inputs to the machine-learning models 220, 222, 226 and/or 228. The information captured is in essence the support organization management team's follow-up behavior on the identified sequences of topics for a summary of a support ticket, as recorded via the user interface. For example, the management team may revise or reject an identification of a topic for a summary of a support ticket for a variety of reasons, and in some cases manually modify the identified topics for part or all of a support ticket. Sweeping in these follow-up actions back into the machine-learning models 220, 222, 226 and/or 228 can enable the machine-learning models 220, 222, 226 and/or 228 to be re-trained in a manner that closely follows the human-decision making component, which the ticket summarizer, classifier, and forecaster systems 218 and/or 224 attempts to model. This feedback loop can enable the machine-learning models 220, 222, 226 and/or 228 to evolve in a personalized manner with respect to the preferences of the management team, in a way that is relevant to the team.

When required, the machine-learning models 220, 222, 226 and/or 228 may be retrained to remain up to date and capture all the variations in incoming data. In addition, the ticket summarizer, classifier, and forecaster training system 218 can bootstrap the training of the machine-learning models 220, 222, 226 and/or 228. Since the machine-learning models 220, 222, 226 and/or 228 demonstrate portability, they may be deployed for support organizations that may be newer and/or have not yet gathered enough historical data to train their customized models.

The entities that the production system 224 analyzes are relevant even beyond the support domain, because factors determined from these entities and their evolving relationships may be used to model behavior patterns in other business workflows which operate on the assumption of the desire for continuously sustained business relationships between a customer of a product and an organization related to the product across multiple product cycles. Therefore, the use of the ticket summarizer, classifier, and forecaster machine-learning models 222 and/or 228 that identifies sequences of topics for a summary of a support ticket may be extended beyond the support space to identify sequences of topics for a summary of the communications between individuals, users, groups, teams, organizations, and businesses in spaces such as user service, sales, engineering, information technology, pharmaceutical, healthcare and medical devices industry, as well as the consumer electronics industry, which may use ticketing systems such as Jira, GitHub, ServiceNow, Salesforce, Zendesk, and Freshdesk.

Figure 4:
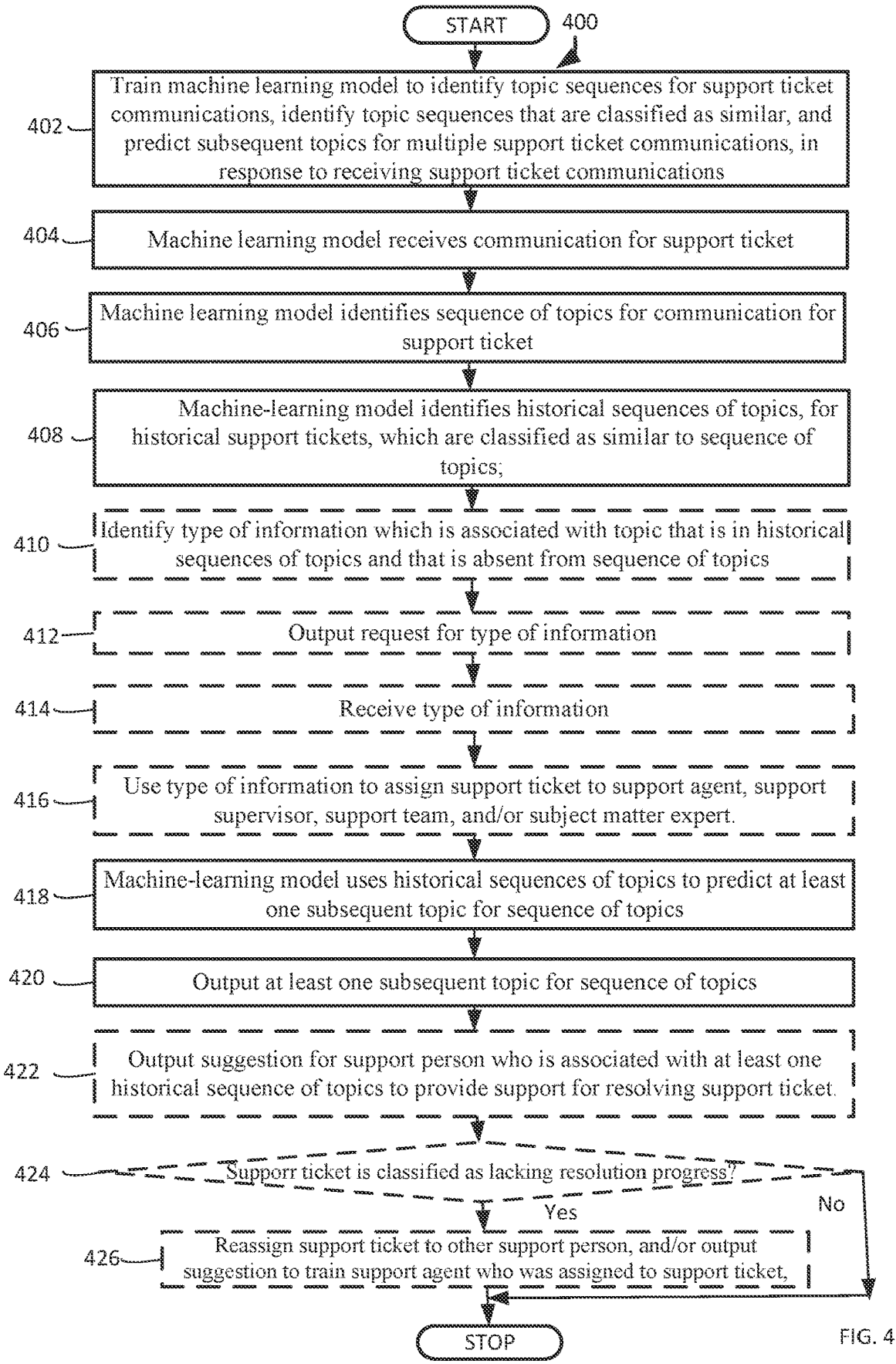
FIG. 4 is a flowchart that illustrates a computer-implemented method for a support ticket summarizer, similarity classifier, and resolution forecaster, under an embodiment.

FIG. 4 is a flowchart that illustrates a computer-implemented method for a support ticket summarizer, similarity classifier, and resolution forecaster, under an embodiment. Flowchart 400 depicts method acts illustrated as flowchart blocks for certain actions involved in and/or between the system elements 202-228 of FIG. 2.

A machine learning model is trained to identify topic sequences for support ticket communications, identify topic sequences that are classified as similar, and predict subsequent topics for multiple support ticket communications, in response to receiving the support ticket communications, block 402. The system trains a machine learning model as a natural language processor for support ticket communications. For example, and without limitation, this can include the training system 218 receiving a training set of support ticket communications, which includes the support ticket communications 100 and its metadata 102 as depicted by FIG. 1A. Then the training system 218 trains the natural language processor machine learning model 220 to identify the sequence of topics: CRM software, inadequate software performance, scanned for viruses, and checked for programs using excessive resources, to identify similar topic sequences for other support tickets, and to use the similar topic sequences to predict subsequent topics which infer the next actions: boot in safe mode and defragment hard disk.

After being trained, the machine learning model receives a communication for a support ticket, block 404. The system receives a support ticket's communication for forecasting the support ticket's resolution. By way of example and without limitation, this can include the ticket summarizer, classifier, and forecaster production system 224 receiving the support ticket communications 104 and its metadata 102 as depicted by FIG. 1B.

Following the receipt of a communication for a support ticket, a machine learning model identifies a sequence of topics for the communication for the support ticket, block 406. The system identifies a support ticket communication's topics to forecast the support ticket's resolution. In embodiments, this can include the natural language processor machine learning model 226 identifying the sequence of topics: CRM software, software malfunction, restarted software, and restarted computer for the customer's support ticket communications 104 at 5:00 P.M, as depicted by FIG. 1B.

Following the identification of the sequence of topics for the communication for the support ticket, historical sequences of topics are identified, for historical support tickets, as being classified as similar to the sequence of topics, block 408. The system identifies similar support tickets to forecast a support ticket's resolution. For example, and without limitation, this can include the ticket summarizer, classifier, and forecaster machine-learning model 228 automatically identifying other support tickets that have similar sequences of topics to the sequence of topics: CRM software, software malfunction, restarted software, and restarted computer.

In addition to identifying historical sequences of topics, for historical support tickets, which are similar to the support ticket's sequence of topics, a type of information is optionally identified which is associated with a topic that is in the historical sequences of topics and that is absent from the sequence of topics, block 410. The system can identify information in similar support tickets but missing from the support ticket to forecast a support ticket's resolution. By way of example and without limitation, this can include the ticket summarizer, classifier, and forecaster machine-learning model 228 identifying that most of the similar sequences of topics include information that specifies the customer's operating system, but at 5:00 P.M. the support ticket's sequence of topics is missing any information that specifies the customer Curt's operating system.

Having identified a type of information that is missing from the support ticket's sequence of topics, a request for the type of information is optionally output, block 412. The system can request information that is missing from the support ticket to forecast a support ticket's resolution. In embodiments, this can include the production server 214 outputting a request for the customer Curt to specify whether his laptop computer 208 is a Mac computer that execute a Mac operating system or is a laptop computer that executes the Microsoft Windows operating system.

After outputting a request for a type of information, the type of information is optionally received, block 414. The system can receive information that was missing from the support ticket to forecast a support ticket's resolution. For example, and without limitation, this can include the production server 214 receiving Curt's answer at 5:02 P.M., which specifies that his laptop computer 208 uses the Microsoft Windows operating system.

Following receipt of the type of information, the type of information is optionally used to assign the support ticket to a support agent, a support agent supervisor, a support team, and/or a subject matter expert, block 416. The system can use information that was missing from the support ticket for forecasting a support ticket's resolution to route the support ticket to support personnel. By way of example and without limitation, this can include the ticket summarizer, classifier, and forecaster production system 224 assigning the customer's support ticket to Ann Agent because she is well-trained at providing support for computers that execute the Microsoft Windows operating system that is executed by the customer's laptop computer 208.

Having identified historical sequences of topics, for historical support tickets, which are similar to the support ticket's sequence of topics, the historical sequences of topics are used to predict at least one subsequent topic for the sequence of topics, block 418. The system uses similar support tickets to forecast a support ticket's resolution. In embodiments, this can include the ticket summarizer, classifier, and forecaster machine-learning model 228 using the similar sequences of topics to predict the support ticket's future sequence of topics and its actions: identify any software patches, undo any recent program or settings changes, uninstall and reinstall the program, and boot up in safe mode.

After using the historical sequences of topics to predict at least one subsequent topic for the sequence of topics, the at least one subsequent topic is output, block 420. The system outputs an action that is based on forecasting a support ticket's resolution. For example, and without limitation, this can include the ticket summarizer, classifier, and forecaster production system 224 outputting a suggestion for a support agent to take the actions: identify any software patches, undo any recent program or settings changes, uninstall and reinstall the program, and boot up in safe mode.

Along with outputting the at least one subsequent topic, a suggestion is optionally output for a support person who is associated with at least one of the historical sequences of topics to provide support for resolving the support ticket, block 422. The system can seek support for a support ticket from support personnel who worked on or are working on similar support tickets. By way of example and without limitation, this can include the ticket summarizer, classifier, and forecaster production system 224 notifying Sue Supervisor, who is experience at resolving CRM software malfunctions on computers that execute the Microsoft Windows operating system, that Curt's support ticket is more than 15 minutes old, and 15 minutes was the average resolution time for support tickets for CRM software malfunctions on computers that execute the Microsoft Windows operating system.

In addition to outputting the at least one subsequent topic, a determination is made whether the support ticket is classified as lacking resolution progress, block 424. The system can identify support tickets that are not progressing toward resolution. In embodiments, this can include the ticket summarizer, classifier, and forecaster production system 224 determining if a support ticket for a problem with a Mac operating system is making progress towards resolution. If the support ticket is classified as lacking resolution progress, the method 400 continues to block 426 to reassign the support ticket and/or train the support agent who was working on the support ticket. If the support ticket is classified as not lacking resolution progress, the method 400 terminates, which enables the summarization of additional support tickets and the forecasting of the resolution of these summarized support tickets.

If the support ticket is classified as lacking resolution progress, the support ticket is optionally reassigned to another support person, and/or a suggestion is optionally output to train a support agent assigned to the support ticket, block 426. The system can reassign a support ticket that is not progressing towards resolution and/or train the support agent who was working on the support ticket. For example, and without limitation, this can include the ticket summarizer, classifier, and forecaster production system 224 reassigning Ann Agent's support ticket for the problem with the Mac operating system to her supervisor Sue, who is identified as having good experience with support tickets for problems with the Mac operating system, and also enrolling Ann in a support agent training course for problems with the Mac operating system.

Although FIG. 4 depicts the blocks 402-426 occurring in a specific order, the blocks 402-426 can occur in another order. In other implementations, each of the blocks 402-426 can also be executed in combination with other blocks and/or some blocks may be divided into a different set of blocks.

System Overview

Figure 5:
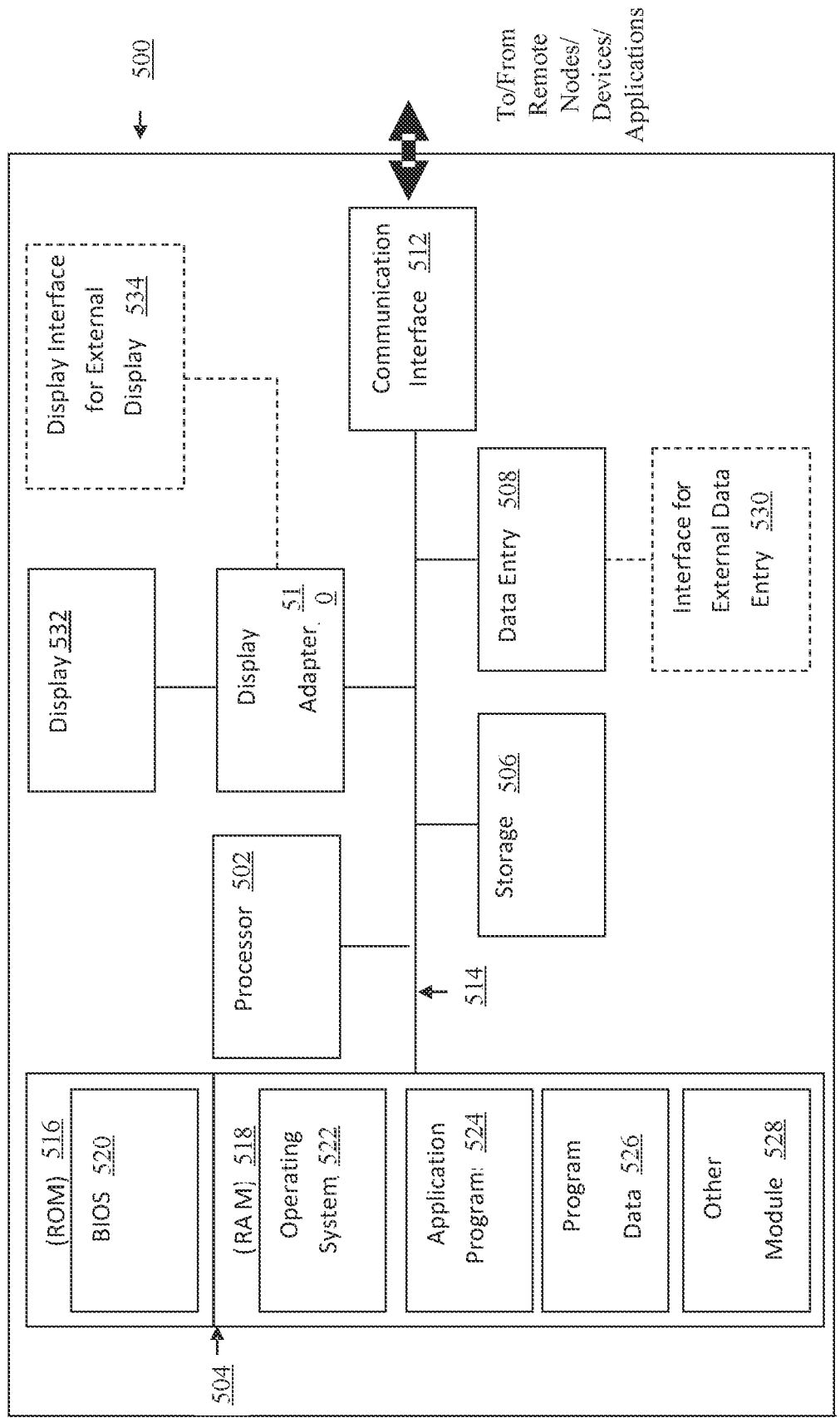
FIG. 5 is a block diagram illustrating an example hardware device in which the subject matter may be implemented.

In exemplary hardware device in which the subject matter may be implemented shall be described. Those of ordinary skill in the art will appreciate that the elements illustrated in FIG. 5 can vary depending on the system implementation. With reference to FIG. 5, an exemplary system for implementing the subject matter disclosed herein includes a hardware device 500, including a processing unit 502, a memory 504, a storage 506, a data entry module 508, a display adapter 510, a communication interface 512, and a bus 514 that couples elements 504-512 to the processing unit 502.

The bus 514 can comprise any type of bus architecture. Examples include a memory bus, a peripheral bus, a local bus, etc. The processing unit 502 is an instruction execution machine, apparatus, or device and can comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 can include a read only memory (ROM) 516 and a random-access memory (RAM) 518. The memory 504 may be configured to store program instructions and data during operation of the hardware device 500. In various embodiments, the memory 504 can include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 504 can also include nonvolatile memory technologies such as nonvolatile flash RAM (NVRAM) or ROM. In some embodiments, it is contemplated that the memory 504 can include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 can include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 500.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like can also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

Several program modules may be stored on the storage 506, the ROM 516 or the RAM 518, including an operating system 522, one or more applications programs 524, program data 526, and other program modules 528. A user can enter commands and information into the hardware device 500 through data entry module 508. The data entry module 508 can include mechanisms such as a keyboard, a touch screen, a pointing device, etc.

Other external input devices (not shown) are connected to the hardware device 500 via an external data entry interface 530. By way of example and not limitation, external input devices can include a microphone, joystick, game pad, satellite dish, scanner, or the like. In some embodiments, external input devices can include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, can function as both the data entry module 508 and the display 532. External display devices can also be connected to the bus 514 via the external display interface 534. Other peripheral output devices, not shown, such as speakers and printers, may be connected to the hardware device 500.

The hardware device 500 can operate in a networked environment using logical connections to one or more remote nodes (not shown) via the communication interface 512. The remote node may be another computer, a server, a router, a peer device, or other common network node, and typically includes many or all the elements described above relative to the hardware device 500. The communication interface 512 can interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 can include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

The arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have properties defined by the format of the data. However, while the subject matter is described in a context, it is not meant to be limiting as those of skill in the art will appreciate that various of the acts and operations described hereinafter can also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for a support ticket summarizer, similarity classifier, and resolution forecaster, the system comprising:
    one or more processors; and
    a non-transitory computer readable medium storing a plurality of instructions, which when executed, cause the one or more processors to:
    train a machine learning model to identify topic sequences for support ticket communications, identify topic sequences that are classified as similar, and predict subsequent topics for multiple support ticket communications, in response to receiving the support ticket communications;
    identify, by the machine learning model, a sequence of topics for a communication for a support ticket and an age of the support ticket, in response to receiving the communication;
    identify, by the machine-learning model, historical sequences of topics, for historical support tickets, which are classified as similar to the sequence of topics, comprising determining historical ages of the historical support tickets are classified as similar to the age of the support ticket;
    predict, by the machine-learning model, based on the historical sequences of topics, at least one subsequent topic for the sequence of topics; and
    output the at least one subsequent topic.

2. The system of claim 1, wherein the plurality of instructions further causes the processor to:
    identify a type of information which is associated with a topic that is in the historical sequences of topics and that is absent from the sequence of topics, and
    output a request for the type of information.

3. The system of claim 2, wherein the plurality of instructions further causes the processor to assign, based on the type of information, the support ticket to at least one of a support agent, a support agent supervisor, a support team, and a subject matter expert, in response to receiving the type of information.

4. The system of claim 1, wherein identifying the historical sequences of topics is based on identifying historical sequences of topics for historical support tickets which are associated with resolutions that are classified as preferable.

5. The system of claim 1, wherein the plurality of instructions further causes the processor to output a suggestion for a support person who is associated with at least one of the historical sequences of topics to provide support for resolving the support ticket.

6. The system of claim 1, wherein the plurality of instructions further causes the processor to at least one of output a suggestion to train a support agent assigned to the support ticket and reassign the support ticket to another support person, in response to the support ticket being classified as lacking resolution progress.

7. A computer-implemented method for a support ticket summarizer, similarity classifier, and resolution forecaster, the computer-implemented method comprising:
    training a machine learning model to identify topic sequences for support ticket communications, identify topic sequences that are classified as similar, and predict subsequent topics for multiple support ticket communications, in response to receiving the support ticket communications;
    identifying, by the machine learning model, a sequence of topics for a communication for a support ticket and an age of the support ticket, in response to receiving the communication;
    identifying, by the machine-learning model, historical sequences of topics, for historical support tickets, which are classified as similar to the sequence of topics, comprising determining historical ages of the historical support tickets are classified as similar to the age of the support ticket;
    predicting, by the machine-learning model, based on the historical sequences of topics, at least one subsequent topic for the sequence of topics; and
    outputting the at least one subsequent topic.

8. The computer-implemented method of claim 7, wherein the computer-implemented method further comprises:
    identifying a type of information which is associated with a topic that is in the historical sequences of topics and that is absent from the sequence of topics, and
    outputting a request for the type of information.

9. The computer-implemented method of claim 8, wherein the computer-implemented method further comprises: assigning, based on the type of information, the support ticket to at least one of a support agent, a support agent supervisor, a support team, and a subject matter expert, in response to receiving the type of information.

10. The computer-implemented method of claim 7, wherein identifying the historical sequences of topics is based on identifying historical sequences of topics for historical support tickets which are associated with resolutions that are classified as preferable.

11. The computer-implemented method of claim 7, wherein the computer-implemented method further comprises outputting a suggestion for a support person who is associated with at least one of the historical sequences of topics to provide support for resolving the support ticket.

12. The computer-implemented method of claim 7, wherein the computer-implemented method further comprises at least one of outputting a suggestion to train a support agent assigned to the support ticket and reassigning the support ticket to another support person, in response to the support ticket being classified as lacking resolution progress.

13. A computer program product, comprising a non-transitory computer-readable medium having a computer-readable program code embodied therein to be executed by one or more processors, the program code including instructions to:
    train a machine learning model to identify topic sequences for support ticket communications, identify topic sequences that are classified as similar, and predict subsequent topics for multiple support ticket communications, in response to receiving the support ticket communications;

identify, by the machine learning model, a sequence of topics for a communication for a support ticket and an age of the support ticket, in response to receiving the communication;

identify, by the machine-learning model, historical sequences of topics, for historical support tickets, which are classified as similar to the sequence of topics, comprising determining historical ages of the historical support tickets are classified as similar to the age of the support ticket;

predict, by the machine-learning model, based on the historical sequences of topics, at least one subsequent topic for the sequence of topics; and output the at least one subsequent topic.

14. The computer program product of claim 13, wherein the program code includes further instructions to:

identify a type of information which is associated with a topic that is in the historical sequences of topics and that is absent from the sequence of topics, output a request for the type of information; and assign, based on the type of information, the support ticket to at least one of a support agent, a support agent supervisor, a support team, and a subject matter expert, in response to receiving the type of information.

15. The computer program product of claim 13, wherein identifying the historical sequences of topics is based on identifying historical sequences of topics for historical support tickets which are associated with resolutions that are classified as preferable.

16. The computer program product of claim 13, wherein the program code includes further instructions to output a suggestion for a support person who is associated with at least one of the historical sequences of topics to provide support for resolving the support ticket.

17. The computer program product of claim 13, wherein the program code includes further instructions to at least one of output a suggestion to train a support agent assigned to the support ticket and reassign the support ticket to another support person, in response to the support ticket being classified as lacking resolution progress.

* * * * *